(12) United States Patent
Lai et al.

(10) Patent No.: US 10,157,249 B2
(45) Date of Patent: Dec. 18, 2018

(54) ASYNCHRONOUS PIPELINE CIRCUIT

(71) Applicants: Taiwan Semiconductor Manufacturing Co., Ltd., Hsin-Chu (TW); National Taiwan University, Taipei (TW)

(72) Inventors: Yi-Hsiang Lai, Taipei (TW); Chun-Hong Shih, Kaohsiung (TW); Jie-Hong Chiang, Taipei (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 107 days.

(21) Appl. No.: 15/347,627

(22) Filed: Nov. 9, 2016

(65) Prior Publication Data

US 2017/0344670 A1 Nov. 30, 2017

Related U.S. Application Data

(60) Provisional application No. 62/343,554, filed on May 31, 2016.

(51) Int. Cl.
*G06F 17/50* (2006.01)
*H03K 19/0948* (2006.01)
*H03K 19/20* (2006.01)

(52) U.S. Cl.
CPC ........ *G06F 17/505* (2013.01); *G06F 17/5031* (2013.01); *G06F 2217/06* (2013.01); *H03K 19/0948* (2013.01); *H03K 19/20* (2013.01)

(58) Field of Classification Search
CPC .............. G06F 17/505; G06F 17/5031; G06F 2217/06; H03K 19/20; H03K 19/0948
USPC ........................................ 716/100, 101, 104
See application file for complete search history.

(56) References Cited

U.S. PATENT DOCUMENTS

| | | | | |
|---|---|---|---|---|
| 5,212,783 A | * | 5/1993 | Sherman ............. | G06F 17/5031 713/503 |
| 5,282,147 A | * | 1/1994 | Goetz et al. .......... | G06F 17/505 716/103 |
| 5,461,573 A | * | 10/1995 | Chakradhar et al. ........................ | G01R 31/318392 716/103 |
| 5,796,621 A | * | 8/1998 | Dudley et al. ...... | G06F 17/5031 716/103 |

* cited by examiner

*Primary Examiner* — Sun Lin
(74) *Attorney, Agent, or Firm* — Duane Morris LLP

(57) ABSTRACT

A method for providing a logic synthesis of a pipeline circuit is disclosed. The method includes: providing a circuit design of the pipeline circuit, wherein the circuit design includes a first logic module as a current stage, and based on an operation of the first logic module, generating a first time marked graph (TMG) that corresponds to a plurality of behavioral phases of the first logic module, wherein the first TMG includes a plurality of vertexes and a plurality of edges, wherein each vertex corresponds to one of the plurality of behavioral phases that occur in sequence and each edge is coupled between two respective vertexes thereby corresponding to a transition from one behavioral phase to another subsequently occurring behavioral phase.

20 Claims, 13 Drawing Sheets

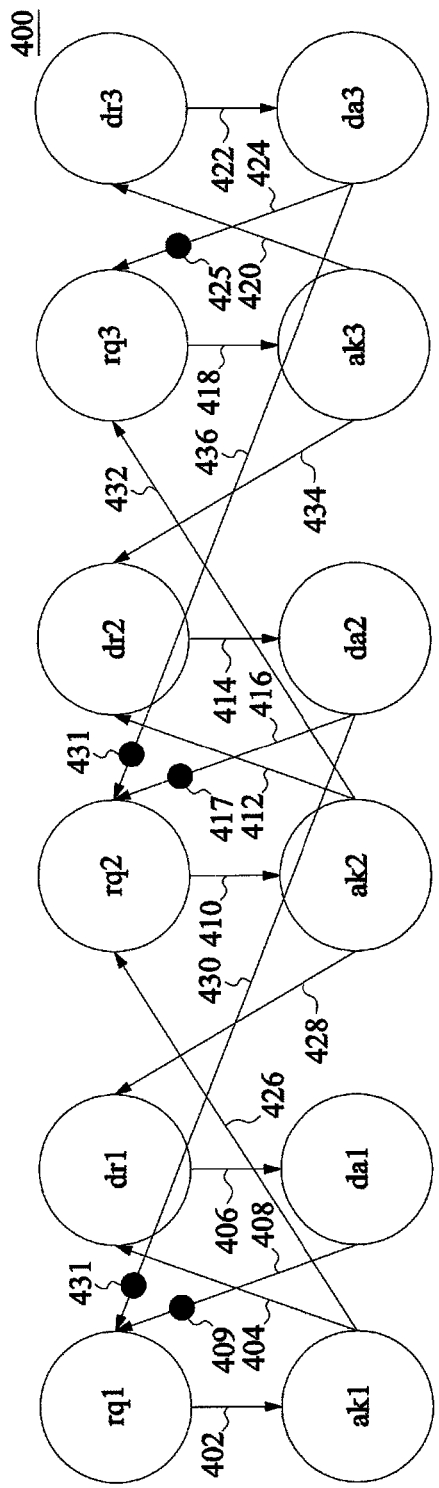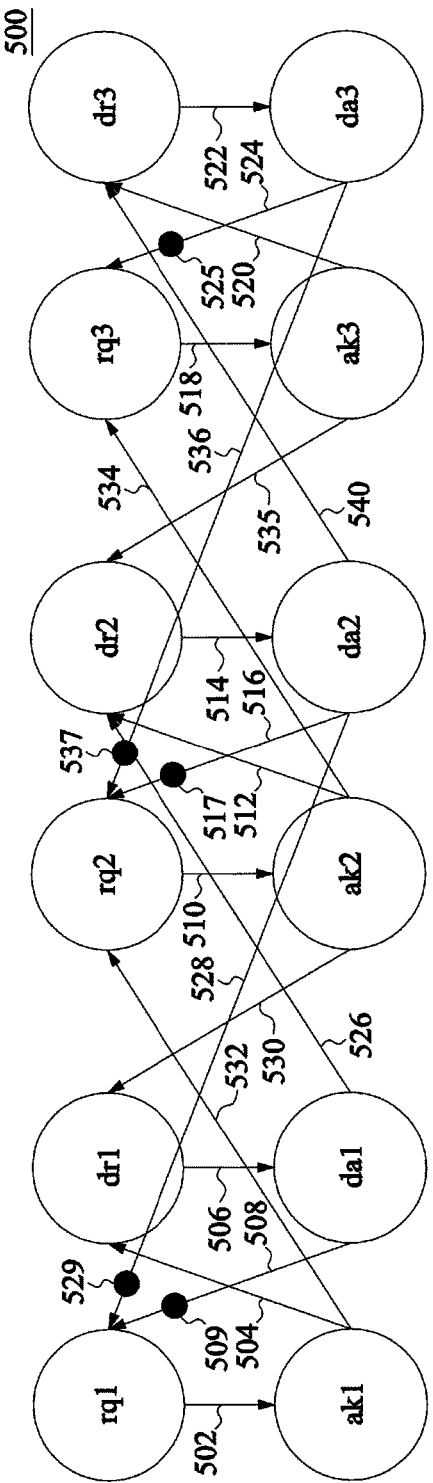
Fig. 4
Fig. 5

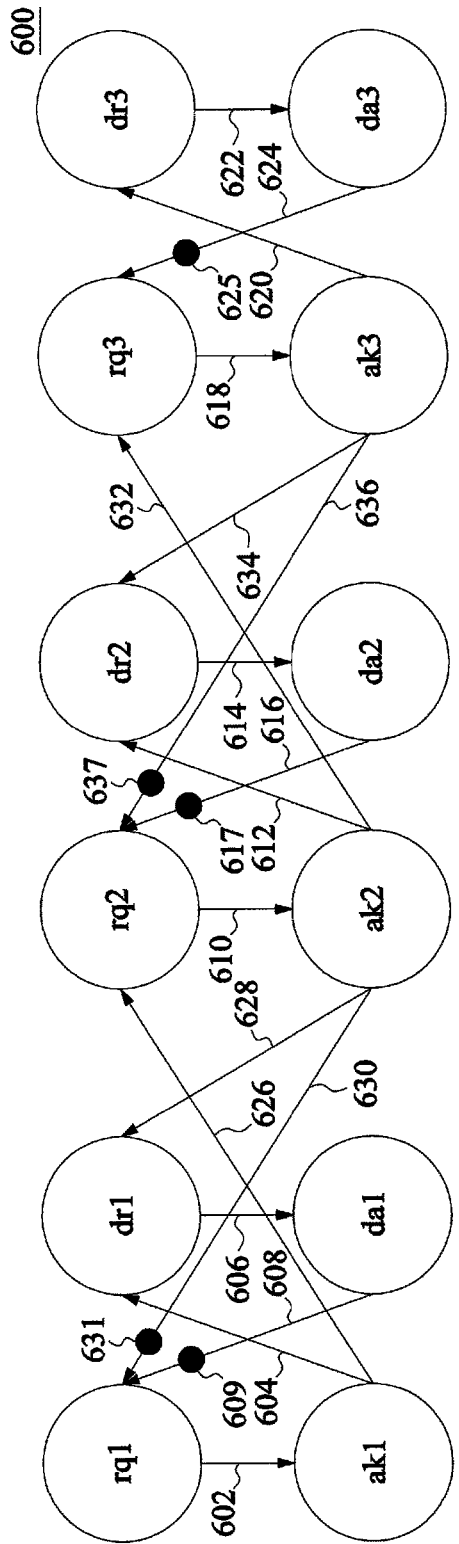
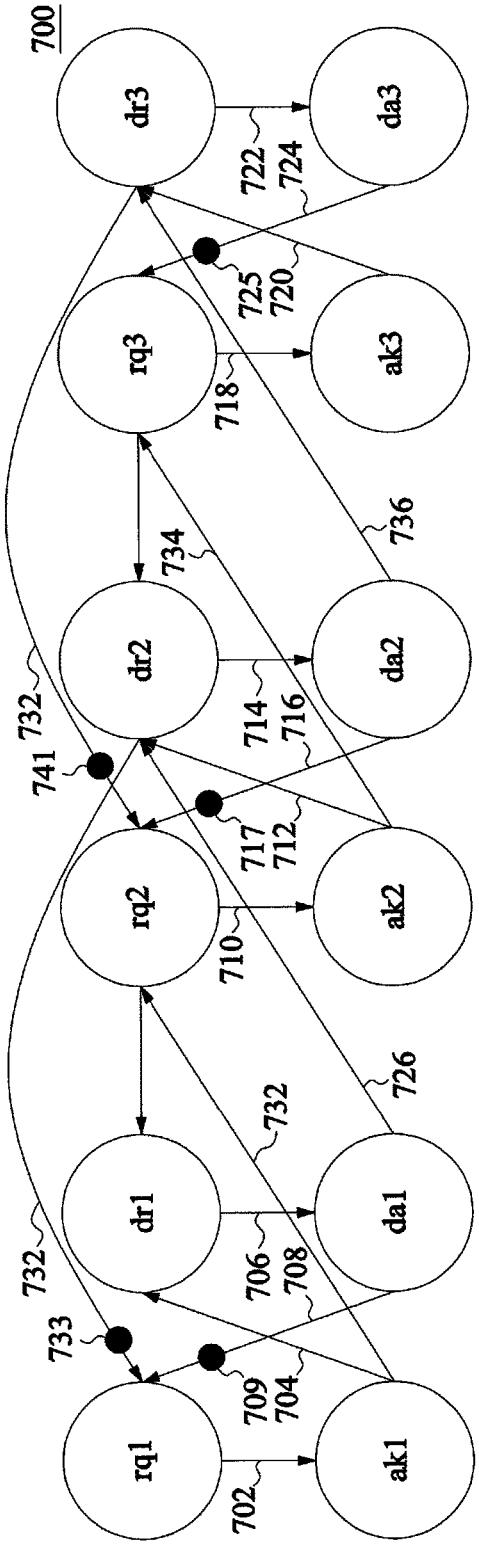
Fig. 6
Fig. 7

ASYNCHRONOUS PIPELINE CIRCUIT

CROSS-REFERENCE TO RELATED APPLICATION

The present application claims priority to U.S. Provisional Patent Application No. 62/343,554, filed on May 31, 2016, which is incorporated by reference herein in its entirety.

BACKGROUND

The recent trend in miniaturizing integrated circuits (ICs) has resulted in smaller devices which consume less power, yet provide more functionality at higher speeds. The miniaturization process has also resulted in stricter design and manufacturing specifications. Various electronic design automation (EDA) processes have been developed to generate, optimize and verify designs for semiconductor devices while ensuring that the design and manufacturing specifications are met. Logic synthesis is one example of such EDA processes.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 4 illustrates a FP-TMG of a pipeline circuit including three Pre-Charged Half Buffer (PCHB) modules at a previous stage, a current stage, and a next stage of the pipeline circuit, respectively, in accordance with some embodiments.

FIG. 5 illustrates a FP-TMG of a pipeline circuit including three Weak-Conditioned Half Buffer (WCHB) modules at a previous stage, a current stage, and a next stage of the pipeline circuit, respectively, in accordance with some embodiments.

FIG. 6 illustrates a FP-TMG of a pipeline circuit including three Pre-Charged Full Buffer (PCFB) modules at a previous stage, a current stage, and a next stage of the pipeline circuit, respectively, in accordance with some embodiments.

FIG. 7 illustrates a FP-TMG of a pipeline circuit including three NULL Convention Logic (NCL) modules at a previous stage, a current stage, and a next stage of the pipeline circuit, respectively, in accordance with some embodiments.

DETAILED DESCRIPTION

Figure 1:
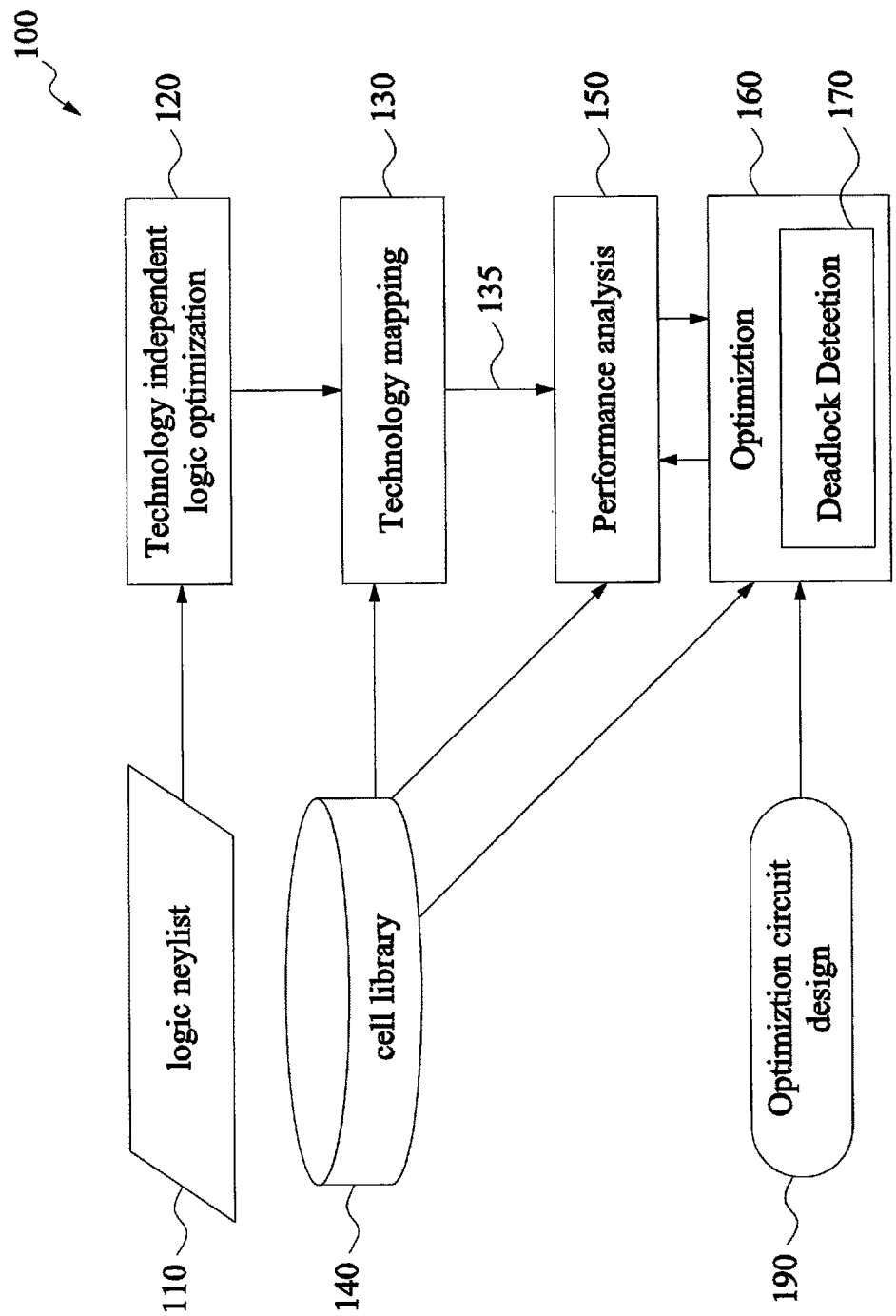
FIG. 1 illustrates a block diagram of a logic synthesis system, in accordance with some embodiments.

The following disclosure provides many different embodiments, or examples, for implementing different features of the disclosed subject matter. Specific examples of components and arrangements are described below. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a block diagram of a logic synthesis system 100 in accordance with some embodiments. The logic synthesis system 100 utilizes one or more EDA tools. The EDA tools, in some embodiments, are one or more sets of executable instructions for execution by a processor or controller or a programmed computer to perform the indicated functionality as described herein.

A logic design of a semiconductor device, such as an IC or a chip, is typically provided by a circuit designer in the form of a logic netlist 110, as shown in FIG. 1. The logic netlist 110 includes a plurality of logic elements interconnected with each other to provide one or more logic functions that the chip is configured to perform. Examples of logic elements include, but are not limited to, AND gates, OR gates, NAND gates, NOR gates, XOR gates, XNOR gates, NOT gates (inverters) and the like, as well as combinations thereof. In some embodiments, the logic netlist 110 is a single-rail logic netlist.

The logic netlist 110 provides information to an input of a technology-independent logic optimization unit 120 which simplifies logic expressions and/or structures of the logic netlist 110. This optimization is performed independently of the technology node that will be used to manufacture the chip. An example of technology-independent logic optimization is described in A. Mishchenko, S. Chatterjee, and R. Brayton. DAG-aware AIG rewriting: A fresh look at combinational logic synthesis. In Proc. Design Automation Conference, pp. 532-535, 2006, which is incorporated by reference herein in its entirety. In some embodiments, the technology-independent logic optimization unit 120 may be omitted.

The logic netlist 110 or a technology-independent optimized netlist provided by the technology-independent logic optimization unit 120 is used as an input for a technology mapping circuit 130. For purposes of brevity, in the description below, the logic netlist 110 and a technology-independent optimized netlist provided by the technology-independent logic optimization 120 are commonly referred to as "the logic netlist." Another input of the technology mapping circuit 130 is provided by a cell library (also referred to as "technology library") 140. The cell library 140 includes a plurality of cells or modules corresponding to logic functions expressed in the logic netlist. In some embodiments, for each logic function expressed in the logic netlist, there are one or more corresponding modules in the cell library 140. In some embodiments, for each logic function expressed in the logic netlist, there are two or more corresponding modules in the cell library 140. The corresponding modules are configured to perform the same logic function, but are different in one or more aspects including, but not limited to, design, area cost, power consumption, and performance (speed or delay). The technology mapping 130 is a process for mapping logic elements in the logic netlist to corresponding modules in the cell library 140, based on the logic functions expressed by the logic elements. The result is a technology-mapped circuit design 135 of the chip in the technology node that will be used to manufacture the chip. In some embodiments, the design 135 provides a network of interconnected nodes in which the mapped modules are arranged at the corresponding nodes of the network. In at least one embodiment, the cell library 140 includes dual-rail modules and the circuit design 135 includes the dual-rail modules mapped onto corresponding single-rail logic elements in the logic netlist. Examples of one or more modules in the cell library 140 in accordance with some embodiments are described in further detail below with respect to FIGS. 2A, 2B and 2C.

A performance analysis unit 150 performs an analysis of the circuit design 135 provided by the technology mapping unit 130 to estimate time delays along various paths and/or at various nodes in the circuit design 135 such as, for example, a cycle time or a throughput of the circuit provided by the circuit design 135. In some embodiments, the throughput is an inverse value of the cycle time. In some embodiments, the performance analysis unit 150 performs a performance analysis based on predetermined characteristics of the mapped modules provided from the cell library 140. In some embodiments, the performance analysis unit 150 is implemented as a stand-alone tool and/or executed outside a logic synthesis process. In some embodiments, the performance analysis 150 is implemented as an integrated part of the logic synthesis process for iterative and/or incremental interactions with a deadlock detection unit 170 contained within an optimization unit 160 as described herein. Such interactions between the performance analysis unit 150 and the optimization unit 160 are indicated by the double arrows illustrated in FIG. 1. Examples of operations performed by the performance analysis unit 150, in accordance with some embodiments, are described with respect to FIGS. 3A-3B, and 4-11.

The optimization unit (also referred to as "technology-dependent optimization unit") 160 optimizes the circuit design 135 based on a result of the performance analysis 150, to achieve one or more optimization objectives. Examples of optimization objectives include, but are not limited to, deadlock detection and prevention, timing, area cost, power consumption, placeability, signal integrity, and the like. Generally, a presence of a deadlock in the circuit design 135 will cause a malfunction by the corresponding circuit. As such, to detect a presence of a deadlock in the circuit design 135 is desirable to correct and prevent such malfunction condition(s). In some embodiments, at least one module in the cell library 140 is added to and/or deleted from the circuit design 135 to detect a presence of a deadlock in the circuit design 135, without changing the overall logic functionality of the circuit design 135. An exemplary technique performed by the deadlock detection unit 170, in accordance with some embodiments, is described with respect to FIG. 12 below.

A result of the technology-dependent optimization unit 160 is an optimized circuit design 190. An exemplary technique to provide such an optimized circuit design 190, in accordance with some embodiments, is described with respect to FIG. 13 below. In subsequent operations in accordance with some embodiments, a physical layout for the optimized circuit design 190 is generated, verified, optimized and manufactured to obtain the designed chip.

Figure 2A:
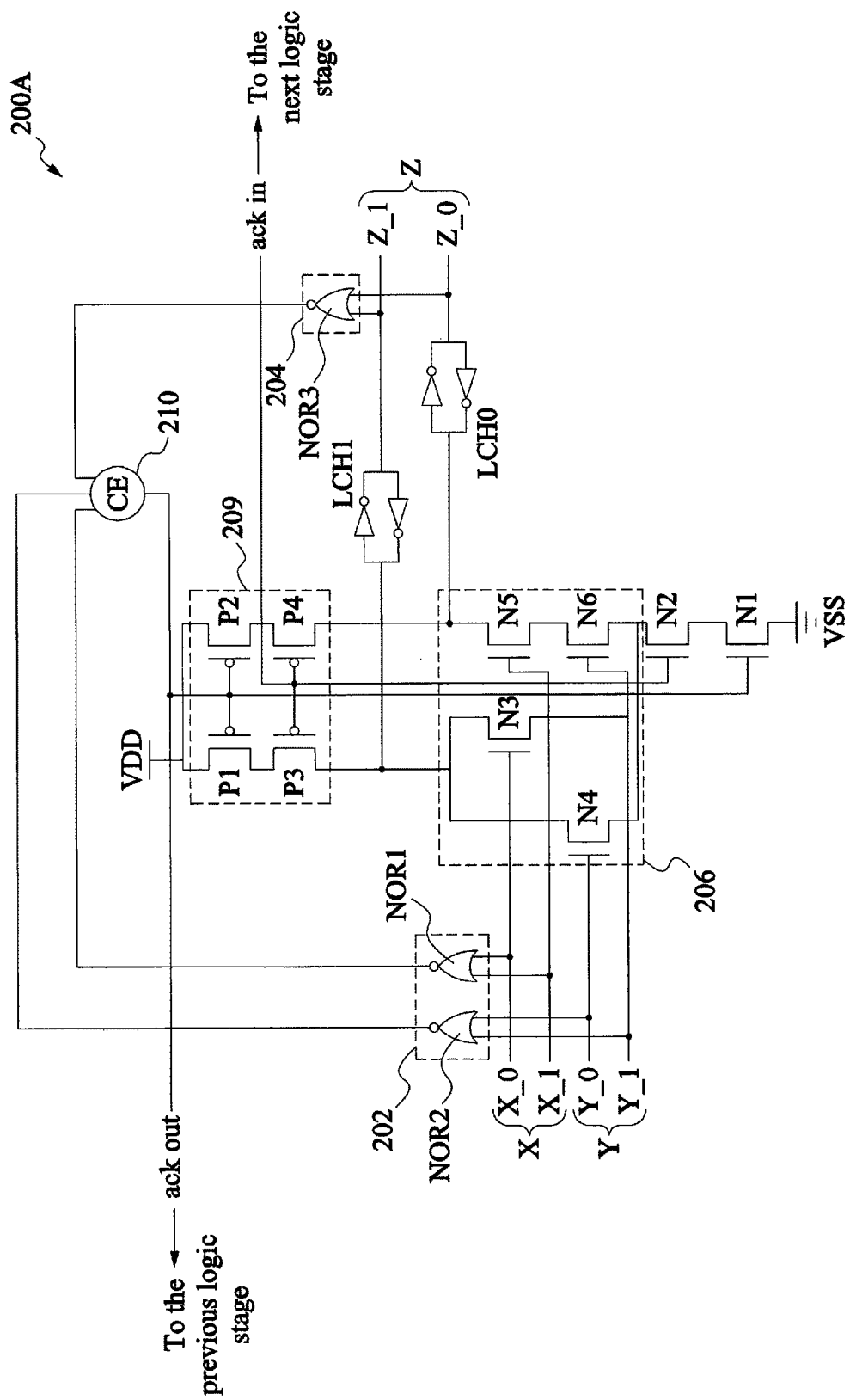
FIG. 2A illustrates a circuit schematic diagram of an exemplary module in the cell library of FIG. 1, in accordance with some embodiments.

As described above, in accordance with various embodiments, various functions can be performed by appropriately configured "units." As used herein, the term "unit" refers to known structures such as hardware, firmware, non-transitory computer-readable media that stores computer-executable instructions to be executed by a computer or processor, or any combination of these elements, for performing the associated functions described herein. Additionally, various units can be discrete units; however, as would be apparent to one of ordinary skill in the art, two or more units may be combined to form a single unit that performs the associated functions according to various embodiments of the invention. Conversely, a single unit may be divided into two or more units that perform respective associated functions according to various embodiments of the disclosure. FIG. 2A illustrates a circuit diagram of a Pre-Charged Half Buffer (PCHB) module 200A in the cell library 140 in accordance with some embodiments. The PCHB module 200A is a dual-rail module. A dual-rail module has two rails for each input or output. For example, PCHB module 200A has two inputs X and Y and an output Z. In some embodiments, PCHB module 200A may include one input (e.g., either X or Y) while remaining within the scope of the present disclosure. Each of input X, input Y and output Z has two rails. Specifically, input X has a first rail $X\_0$ and a second rail $X\_1$, input Y has a first rail $Y\_0$ and a second rail $Y\_1$, and output Z has a first rail $Z\_0$ and a second rail $Z\_1$. An input or an output is in a DATA state if one of the corresponding rails has logical "0." For example, input X has two DATA states, namely, DATA 0 when $X\_0=1$ and $X\_1=0$, and DATA 1 when $X\_0=0$ and $X\_1=1$. An input or an output is in a NULL state if both of the corresponding rails have logical "0." An input or an output is in an INVALID state if both of the corresponding rails have logical "1." For example, input X is in a NULL state when $X\_0=0$ and $X\_1=0$. The number of inputs of the PCHB module 200A, i.e., two inputs, is an example. In accordance with various embodiments, the modules contained in the cell library 140 may each have any number of inputs. In some embodiments, to reduce the amount of computation workload involved in the electronic design automation (EDA) processes, the maximum number of inputs of each module is capped at 4, i.e., each module can have 1, 2, 3 or 4 inputs.

The PCHB module 200A further includes an input completion detector 202, an output completion detector 204, a logic evaluation block 206, a pre-charging circuit 209, an input acknowledgement node ack_in that is configured to receive signal ack_in, and an output acknowledgement node ack_out that is configured to transmit signal ack_out. In the following description, a node and a corresponding signal (i.e., a signal being transmitted or received) on the node are commonly referred to using the node name. For example, "X_0" is used interchangeably hereafter to denote both the first rail of the input X and also the signal or a logic state of that rail; "ack-in" is used interchangeably hereafter to denote the signal received at node ack_in; "ack-out" is used interchangeably hereafter to denote the signal transmitted at node ack_out.

The input completion detector 202 is coupled to the input X and input Y. In the example configuration shown in FIG. 2A, the input completion detector 202 includes two NOR gates NOR1 and NOR2. Inputs of NOR1 are coupled to the corresponding rails of the input X. Inputs of NOR2 are coupled to the corresponding rails of the input Y. Outputs of NOR1 and NOR2 are coupled to first and second inputs of a C-gate or C-element CE 210. The described configuration of the input completion detector 202 is an example. Other configurations of the input completion detector 202 are within the scope of various embodiments.

The output completion detector 204 is coupled to the output Z. In the example configuration shown in FIG. 2A, the output completion detector 204 includes a NOR gate, NOR3. Inputs of NOR3 are coupled to the corresponding rails of the output Z. An output of NOR3 is coupled to a third input of CE 210. An output of CE 210 is coupled to ack_out. The described configuration of the output completion detector 204 is an example. Other configurations of the output completion detector 204 are within the scope of various embodiments.

CE 210 is configured to switch its output when all its inputs match. For example, when all inputs of CE 210 have logical "0," ack_out at the output of CE has logical "0." CE maintains ack_out at logical "0" until all inputs of CE have logical "1," at which time, CE switches ack_out to logical "1." Other configurations for generating ack_out are within the scope of various embodiments.

The logic evaluation block 206 is configured to perform a logic function (also referred to herein as "logic evaluation") using input signals provided by the input X and input Y rails, and to output an output signal corresponding to a result of the logic evaluation at the output Z rails. An onset of output Z is a logic function using inputs X and Y to result in Z being in a DATA 1 state. An offset of output Z is a logic function using inputs X and Y to result in Z being in a DATA 0 state. Accordingly, in some embodiments, the logic evaluation block 206 may include an onset part that contains transistors N3 and N4 to implement the onset function, and an offset part that contains transistors N5 and N6 to implement the offset function. Signal-wise, the logic evaluation block 206 is coupled to the input X and input Y nodes for its inputs, and coupled to the output Z nodes for its output, as shown in FIG. 2A. Power-wise, the logic evaluation block 206 is coupled to a first power supply voltage VDD through the pre-charging circuit 209 at one end, and to a second power supply voltage VSS at another end via transistors N1 and N2, as shown in FIG. 2A.

In the example configuration shown in FIG. 2A, the logic evaluation block 206 is configured to perform a NAND2 (2-input NAND) logic function, and includes four transistors N3-N6. Drains of N3 and N4 are coupled to Z_1 via a latch LCH1 212 comprising two inverters coupled to each other in a ring configuration, as shown. Sources of N3 and N4 are coupled to VSS via serially-connected transistors N1 and N2. A gate of N3 is coupled to X_0. A gate of N4 is coupled to Y_0. A drain of N5 is coupled to Z_0 via a latch LCH0 comprising two inverters coupled to each other in a ring configuration, as shown. A source of N5 is coupled to a drain of N6. A Source of N6 is coupled to VSS via serially-connected N1 and N2. A gate of N5 is coupled to X_1. A gate of N6 is coupled to Y_1. In some embodiments, N3 defines a logic state of the logic evaluation block 206 and is referred to as one onset transistor of the logic evaluation block 206, i.e., after N1 and N2 are turned ON by ack_out and ack_in, respectively, Z_1=1 when N3 is turned ON by X_0=1. Another onset transistor is N4, which defines a logic state of the logic evaluation block 206, i.e., Z_1=1 when N4 is turned ON by Y_0=1. Similarly, a pair of offset transistors is the string of N5 and N6, which defines a logic state of the logic evaluation block 206, i.e., Z_0=1 when N5 and N6 are turned ON by X_1=1 and Y_1=1. N3 and N4 define DATA 1 of the output Z and determine the onset of the logic evaluation block 206. The string of N5 and N6 defines DATA 0 of the output Z, and determines the offset of the logic evaluation block 206. The described logic function and/or configuration of the logic evaluation block 206 is merely an example. Other configurations and/or logic functions of the logic evaluation block 206 are within the scope of various embodiments.

The pre-charging circuit 209 is configured to pre-charge the logic evaluation block 206 in response to ack_out and ack_in. Considering the PCHB module 200A as a current logic stage, ack_out of the current logic stage is coupled to ack_in of a previous logic stage, and ack_in of the current logic stage is coupled to ack_out of a next logic stage. The output Z of the current logic stage is coupled to an input of the next logic stage, and the output of the previous logic stage is coupled to one of the inputs X and Y of the current logic stage. In the example configuration shown in FIG. 2A, the pre-charging circuit 209 includes four transistors P1-P4. P1 and P3 are serially connected between VDD and the drains of N3 and N4. P2 and P4 are serially connected between VDD and the drain of N5. Gates of P1 and P2 are coupled to ack_out and to a gate of N1. Gates of P3 and P4 are coupled to ack_in and to a gate of N2. The described configuration of the pre-charging circuit 209 is merely an example. Other configurations of the pre-charging circuit 209 are within the scope of various embodiments. In some embodiments, transistors with names beginning with "P" are p-channel metal-oxide semiconductor (PMOS) transistors, transistors with names beginning with "N" are n-channel metal-oxide semiconductor (NMOS) transistors, and other logic gates such as NOR1-NOR3, LCH1-LCH2 and CE are implemented with PMOS and/or NMOS transistors. Other type of transistors are within the scope of various embodiments.

The operation of the PCHB module 200A in accordance with some embodiments is described below. In a previous logic evaluation, the inputs X and Y were both in DATA states and output Z was in a DATA state. The input completion detector 202 and output completion detector 204, respectively, outputted logical "0," corresponding to the DATA states of the input X, input Y and output Z, to the inputs of CE which switched ack_out to a logical "0." In some embodiments, CE maintains ack_out at a logical "0" until all the input X, input Y and output Z have NULL states. The signal ack_out=0 is sent to ack_in of the previous logic stage, indicating that the current logic stage has completed its logic evaluation and enabling the previous logic stage to pre-charge. In the current logic stage, ack_out=0 turns ON P1 and P2, and turns OFF N1. The pre-charging circuit 209 waits for ack_in from the next logic stage before beginning the pre-charging of the logic evaluation block 206.

After the next logic stage has completed its logic evaluation, the next logic stage transitions ack_in of the current logic stage to logical "0" which turns ON P3 and P4, and turns OFF N2. The logic evaluation block 206 is isolated from VSS and pre-charged from VDD via turned ON P1-P4 of the pre-charging circuit 209. When the logic evaluation block 206 is pre-charged via the pre-charging circuit 209, both Z_0 and Z_1 are at logical "0" corresponding to a NULL state of the output Z. When both inputs X and Y are at NULL states, the input completion detector 202 and output completion detector 204 output logical "1," corresponding to the NULL states of the input X, input Y and output Z, to the inputs of CE which switches ack_out to a logical "1." In some embodiments, the NULL states of inputs X and Y may be provided by a user of the PCHB module 200A. As a result, P1 and P2 are turned OFF and N1 is turned ON. The signal ack_out=1 is sent to ack_in of the previous logic stage, indicating that the current logic stage has completed its pre-charging and enabling the previous logic stage to perform its logic evaluation. When ack_in goes high (meaning the next logic stage is already pre-charged), P3 and P4 are turned OFF and N2 is turned ON. Accordingly, the logic evaluation block 206 is isolated from VDD and connected to VSS via turned ON N1 and N2. The current logic stage enters an evaluation phase during which the logic evaluation block 206 performs a logic evaluation of the input signals at the input X and input Y, and outputs a corresponding output signal to the output Z. When the logic evaluation block 206 completes the logic evaluation, CE 210 switches ack_out to a logical "0," as described herein.

In some embodiments, the PCHB module 200A does not evaluate (i.e., perform a logic evaluation) until all inputs and the output are in NULL states (i.e., pre-charged), and does not pre-charge until all inputs and the output are in DATA states (i.e., evaluated). The described operation herein is merely an example. Other arrangements are within the scope of various embodiments. For example, in some embodiments, the PCHB module 200A is configured to take advantage of input control values for early function valuation, i.e., when any one of the input X or input Y of the NAND2 function has DATA 0, the output Z is determined to be DATA 1 even if the other input is in a NULL state.

Figure 2B:
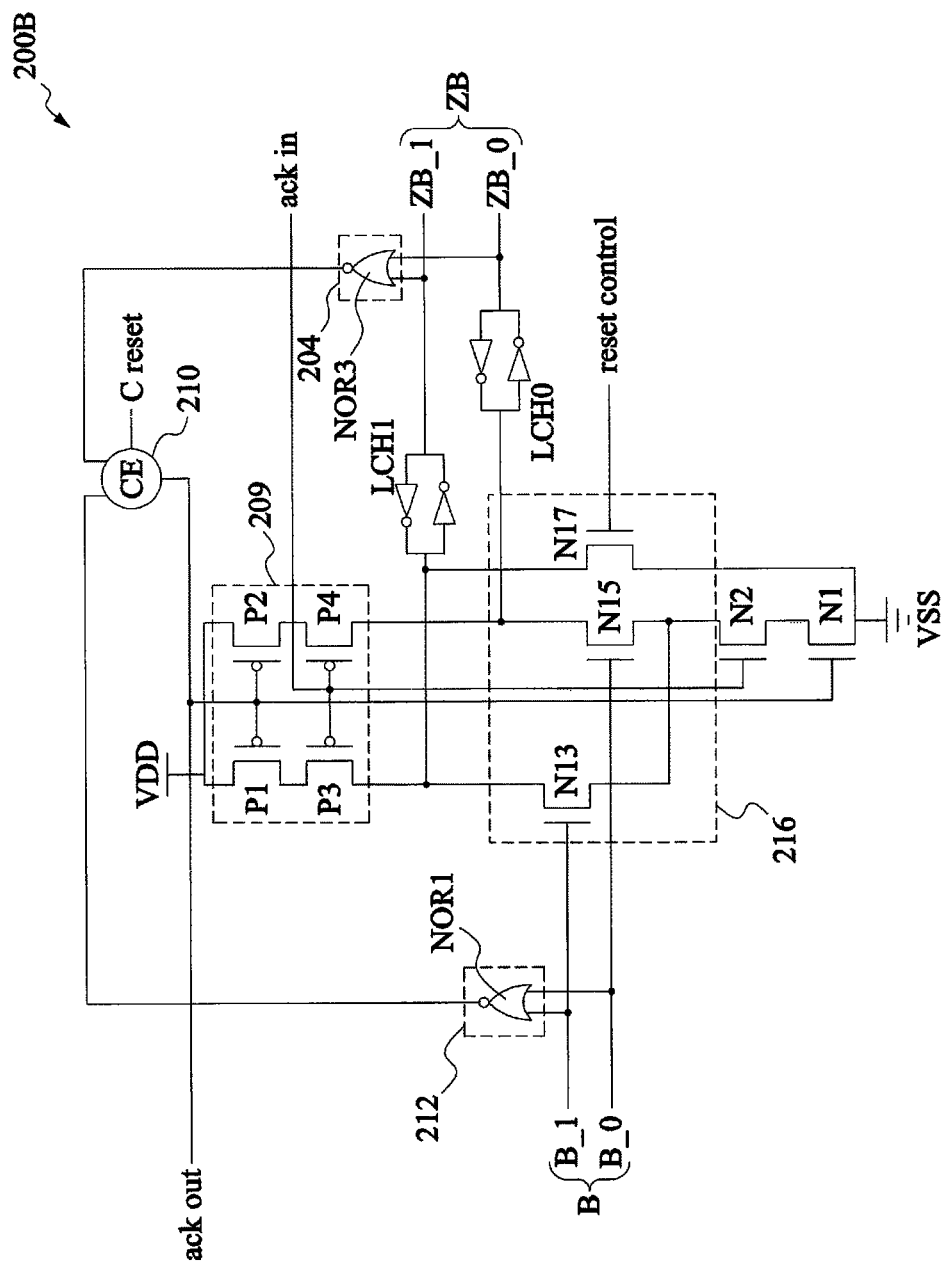
FIG. 2B illustrates a circuit schematic diagram of another exemplary module in the cell library of FIG. 1, in accordance with some embodiments.
Figure 2C:
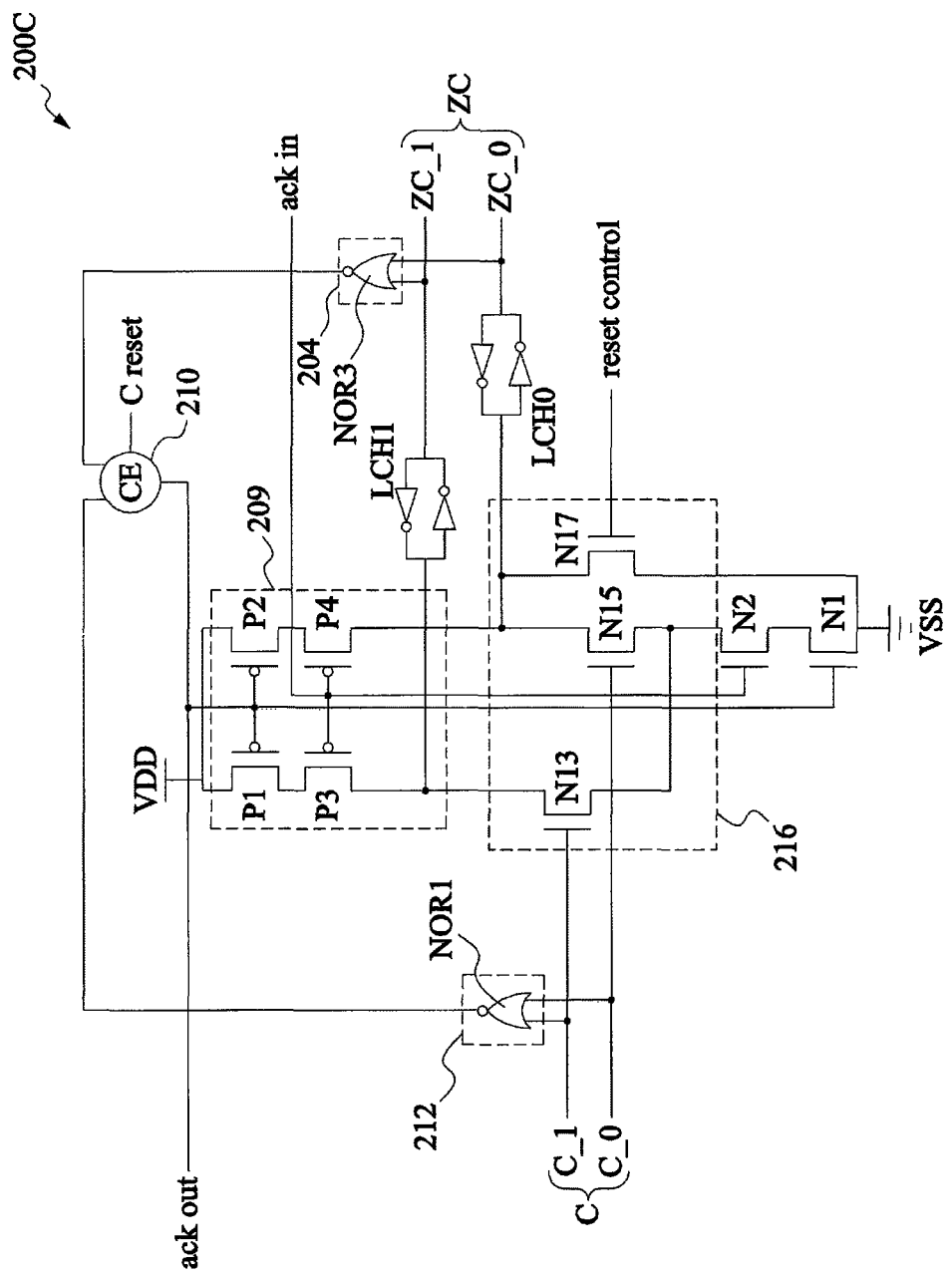
FIG. 2C illustrates a circuit schematic diagram of yet another exemplary module in the cell library of FIG. 1, in accordance with some embodiments.

FIGS. 2B and 2C illustrate circuit diagrams of reset-latch PCHB modules (hereinafter "reset-latch") 200B and 200C, respectively, which are contained in the cell library 140, in accordance with some embodiments. The reset-latches 200B and 200C illustrated in FIGS. 2B and 2C are similar to the PCHB module 200A of FIG. 2A except that each of the reset-latches 200B and 200C further includes an additional input c_reset to the CE 210 and a different evaluation block 216. Additionally, as described above, any desired number of inputs may be used for a PCHB module. In the illustrated embodiment of FIGS. 2B and 2C, the reset-latches 200B and 200C include one input B and C, respectively, and each input has two rails. Specifically, input B has a first rail B_1 and a second rail B_0; input C has a first rail C_1 and a second rail C_0. Thus, input completion detector 212 of the reset-latches 200B and 200C includes only a single NOR logic gate (NOR1). Other than the number of inputs, the number of NOR gates in the input completion detector 212, the logic evaluation block 216, and the additional input to CE 210, the latches 200B and 200C are substantially similar to the PCHB module 200A as described in FIG. 2A. For example, similar to the PCH module 200A, both of the reset-latches 200B and 200C include: the output completion detector 204, the pre-charging circuit 209 that selectively turns ON or OFF its transistors P1-P4 in response to ack_in and ack_out, the latches LCH0 and LCH1 coupled between the output (e.g., ZB and ZC in FIGS. 2B and 2C, Z in FIG. 2A) and the logic evaluation block (e.g., 216 in FIGS. 2B and 2C, 206 in FIG. 2A), and the transistors N1 and N2 coupled between the evaluation block (e.g., 206 and 216) and VSS.

Since in the illustrated embodiment of FIGS. 2B and 2C, the reset-latches 200B and 200C each includes one input, accordingly, the logic evaluation block 216 may comprise only three transistors N13, N15 and N17. That is, the evaluation block 216 may include one onset transistor (e.g., N13), one offset transistor (e.g., N15), and a transistor configured to receive a reset_control signal (e.g., N17), which will be discussed in further detail below. N13 and N15 of the logic evaluation block 216 are substantially similar to transistors N3 and N5 of the logic evaluation block 206, respectively. As such, N13 defines a logic state of the logic evaluation block 216, i.e., in the example of reset-latch 200B, after N1 and N2 are turned ON by ack_out and ack_in, respectively, ZB_1=1 when N13 is turned ON by B_1=1, and in the example of reset-latch 200C, after N1 and N2 are turned ON by ack_out and ack_in, respectively, ZC_1=1 when N13 is turned ON by C_1=1. Similarly, N15 defines a logic state of the logic evaluation block 216, i.e., ZB_0=1 when N15 is turned ON by B_0=1 and C_0=1 in the reset-latches 200B and 200C, respectively. Transistor N13 defines DATA 1 of the outputs ZB and ZC of the reset-latches 200B and 200C, respectively, and determine the onset of the logic evaluation block 216. Transistor N15 defines DATA 0 of the outputs ZB and ZC of the reset-latches 200B and 200C, respectively, and determines the offset of the logic evaluation block 216. The described logic function and/or configuration of the logic evaluation block 216 is merely an example. Other configurations and/or logic functions of the logic evaluation block 216 are within the scope of various embodiments.

The logic evaluation block 216 of reset-latches 200B and 200C further includes transistor N17, which functions as a reset transistor. In the illustrated embodiment of the reset-latch 200B (FIG. 2B), the reset transistor N17 has a drain coupled to output ZB_1 through latch LCH1 and to the source of P3 of the pre-charging circuit 209; a source coupled to VSS; and a gate coupled to node reset_control. In the illustrated embodiment of FIG. 2C, reset-latch 200C is substantially similar to reset-latch 200B except that the drain of the reset transistor N17 (of the logic evaluation block 216) is coupled to output ZC_0 through latch LCH0 and to the source of P4 of the pre-charging circuit 209. In some embodiments, the reset transistor N17 is configured to receive a reset_control signal at the gate of N7, and as such, the node reset_control and the signal reset_control are interchangeably used hereinafter. In some embodiments, the input c_reset is configured to receive a c_rest signal.

The operations of reset-latches 200B and 200C are substantially similar to the operation of PCHB module 200A, as described above, except that when the c_reset is set at a logical 0 and reset_control is set at logical 1 (by a user), the reset-latches 200B and 200C may respectively generate an initial data value (either DATA 1 or DATA 0) at the outputs ZB and ZC. More specifically, in the example of reset-latch 200B of FIG. 2B, when c_reset is at a logical 0 and reset_control is at a logical 1, regardless of the states of input B and output ZB (i.e., outputs of NOR1 and NOR3), output ZB may be caused to be in DATA 1 state, i.e., ZB_1=1 and ZB_0=0. Similarly, in the example of reset-latch 200C of FIG. 2C, when c_reset is at a logical 0 and reset_control is at a logical 1, regardless of the states of input C and output ZC (i.e., outputs of NOR1 and NOR3), output ZC may be caused to be in DATA 0 state, i.e., ZC_1=0 and ZC_0=1.

Figure 3A:
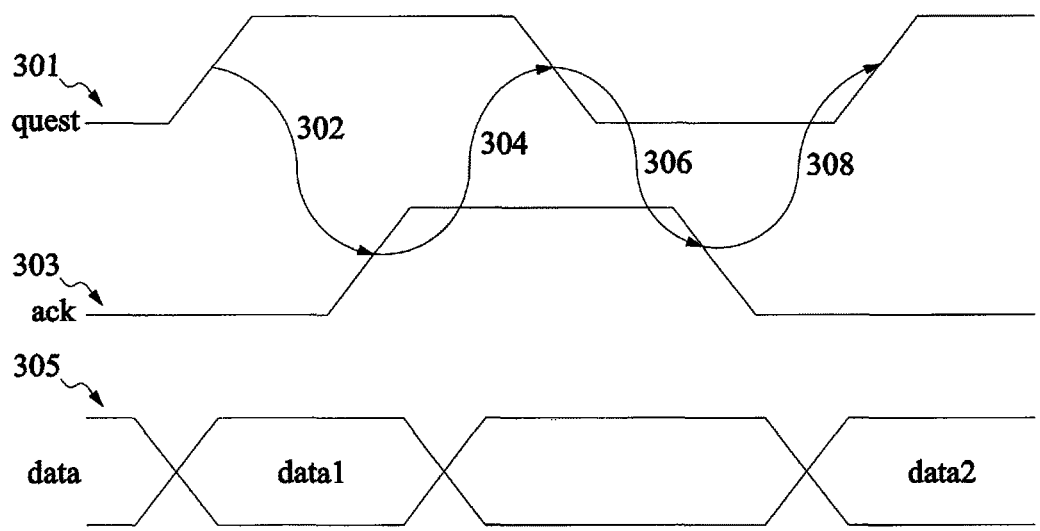
FIG. 3A illustrates a timing diagram of communication signals between a sender and a receiver of a circuit, in accordance with some embodiments.

FIG. 3A illustrate a timing diagram of multiple communication signals between a sender and a receiver of a pipeline circuit (e.g., an asynchronous pipeline circuit). In some embodiments, signal 301 represents a waveform of a request signal sent by the sender (and received by the receiver); signal 303 represents a waveform of an acknowledge signal sent by the receiver (and received by the sender); signal 305 represents a waveform of data processed between the sender and the receiver. In general, each module (circuit element) in a pipeline circuit includes an input request port and/or an output request port, and an input acknowledge port and/or an output acknowledge port. Such input/output request/acknowledge ports are used to send/receive a request signal, and/or send/receive an acknowledge signal. More specifically, in the illustrated embodiment of FIG. 3A, initially, the sender sends the request signal and "data 1" to the receiver by transitioning the request signal from low to high. In response to the request signal and "data 1" being received by the receiver, following line 302, the receiver transitions the acknowledge signal from low to high. As such, the "data 1" (shown in FIG. 3A) may be with the receiver. Subsequently, following line 304, the sender resets the request signal by transitioning the request signal from high to low, and, following line 306, the receiver resets the acknowledge signal by transitioning the acknowledge signal from high to low. Subsequently, following line 308, the sender may send another request signal and "data 2" (FIG. 3A) to the receiver by again transitioning the request signal from low to high. Such request/acknowledge communications between a sender and a receiver are typically based on a protocol that is referred to as a four-phase handshaking protocol.

Figure 3B:
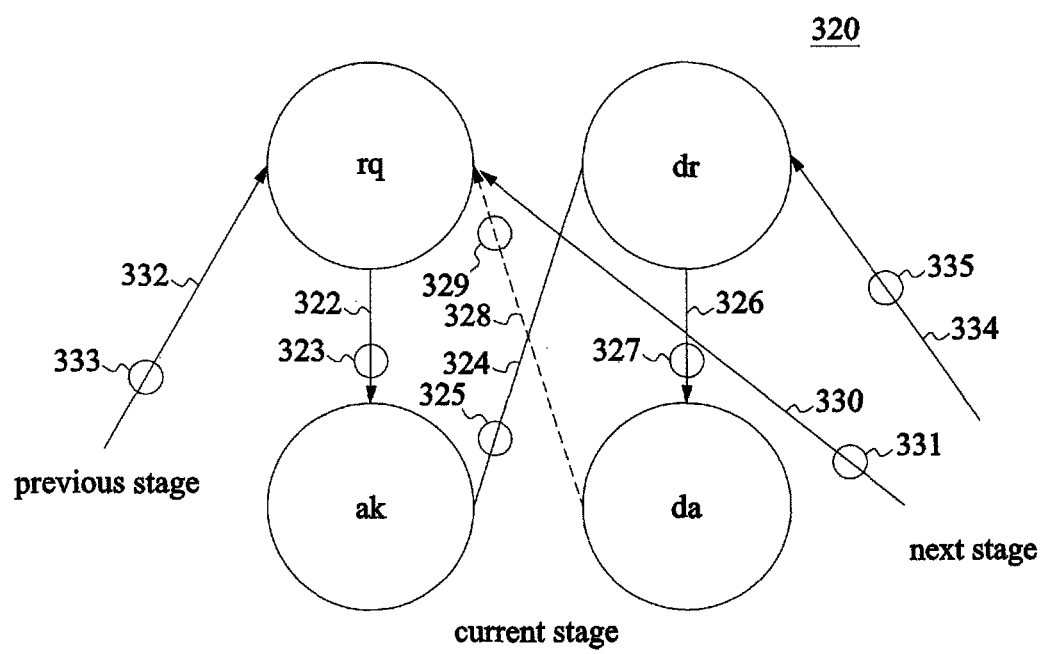
FIG. 3B is an abstract diagram illustrating a four-phase time marked graph (FP-TMG) that represents phase transitions of the sender or receiver of FIG. 3A, in accordance with some embodiments.

Based on the four-phase handshaking protocol as described above with respect to FIG. 3A, in some embodiments, transitions between plural (behavioral) phases of a module of the cell library 140 may be represented by using a four-phase time marked graph (FP-TMG). Moreover, transitions of (behavioral) phases across plural modules of the cell library 140 may also be represented by using such a FP-TMG. FIG. 3B illustrates an FP-TMG 320 that represents transitions between a request phase ("rq" as shown in FIG. 3B), an acknowledge phase ("ak" as shown in FIG. 3B), a de-request phase ("dr" as shown in FIG. 3B), and a de-acknowledge phase ("da" as shown in FIG. 3B) of a module (e.g., 200A, 200B, 200C, etc.) operating as a current stage of a pipeline circuit. The current stage of a pipeline circuit is generally referred to as a currently operating stage in the pipeline circuit. In some embodiments, the pipeline circuit may include at least one previous stage and at least one next stage that occur before the current stage and after the current stage, respectively, along the pipeline, as shown in FIG. 3B. In some embodiments, the previous stage may provide an output signal (e.g., input data signal, a request signal, an acknowledge signal, or a combination thereof) to the current stage, and, in response, the current stage may provide a response signal (e.g., a request signal, an acknowledge signal, or a combination thereof) to the previous stage. Similarly, the current stage may provide an output signal (e.g., input data signal, a request signal, an acknowledge signal, or a combination thereof) to the next stage, and, in response, the next stage may provide a response signal (e.g., a request signal, an acknowledge signal, or a combination thereof) to the current stage.

More specifically, the FP-TMG 320 further includes directed edges 322, 324, 326, and 328. A directed edge may be referred to as an edge with a direction that originates from a first phase and, along the direction, points to a second phase. More specifically, each of the directed edges represents a transition from the rq phase to the ak phase, a transition from the ak phase to the dr phase, a transition from the dr phase to the da phase, and a transition from the da phase to the rq phase, respectively, of the module. In some specific embodiments, such rq, ak, dr and da phases in the FP-TMG 320 may each correspond to a "behavioral phase" of a module of the cell library 140 while the module is under operation. Examples of such behavioral phases are described in further detail below. In some embodiments, in a FP-TMG, each of the rq, ak, dr, and da phases may be referred to as a "vertex" of the FP-TMG. In some embodiments, each phase of a FP-TMG (i.e., the rq, ak, dr, and da phases) occurs at a corresponding "firing time," i.e., a time when a respective phase begins, which is described in further detail below.

Using the PCHB module 200A of FIG. 2A as an example, before the operation of the PCHB module 200A, the PCHB module 200A was at a "pre-charged" phase. In this pre-charged phase, the PCHB module 200A has finished pre-charging the logic evaluation block 206 (i.e., N3-N6), and inputs X and Y and output Z are at NULL states. Accordingly, ack_out is at logical 1. As described above with respect to FIG. 2A, ack_in of the current stage (i.e., the PCHB module 200A in FIG. 2A) is coupled to ack_out of the next stage. In some embodiments, assuming that before the operation of the PCHB module 200A, the next stage has also finished with the pre-charging. As such, ack_out of the next stage is at logical 1, i.e., ack_in of the current stage is at logical 1. More specifically, outputs of NOR1 and NOR2 (i.e., input completion detector 202) are at logical 1's because X and Y are at NULL states; output of NOR3 (i.e., output completion detector 204) are at a logical 1 because Z is at NULL state. In some embodiments, such a pre-charged phase of the PCHB module 200A may correspond to the "da" phase of the FP-TMG 320.

Referring still to FIG. 2A, in response to reception of input data, each of the inputs X and Y may transition from a NULL state to either a DATA 1 or DATA 0 state, and the operation of the PCHB module 200A may start. More specifically, upon the inputs X and Y transitioning from NULL to DATA 1 or 0 states (and the logic evaluation block 206 is pre-charged), the logic evaluation block 206 may start to evaluate the inputs X and Y. Continuing using the same example, upon reception of input data, input X may transition from the NULL state (i.e., X_0=0 and X_1=0) to DATA 0 (i.e., X_0=0 and X_1=1), and input Y may transition from the NULL state (a logical 00) to DATA 1 (i.e., Y_0=1 and Y_1=0). Accordingly, the logic evaluation block 206 starts to evaluate the DATA 1 and 0. In some embodiments, the PCHB module 200A may be referred to as being in the evaluation phase as described in FIG. 2A. During the evaluation phase, outputs of NOR1 and NOR2 (i.e., input completion detector 202) transition from logical 1 to 0 while output of NOR3 (i.e., output completion detector 204)

remain at logical 1 because Z is still at the NULL state (the evaluation is not finished yet). In some embodiments, such an "evaluation" phase of the PCHB module 200A may correspond to the "rq" phase of the FP-TMG 320 in FIG. 3B. That is, the PCHB module 200A transitions from the da phase to the rq phase through the directed edge 328. Accordingly, in some embodiments, the firing time of the rq phase of the PCHB module 200A corresponds with a time when the evaluation starts.

More specifically, according to the illustrated embodiment of FIG. 3B, before the PCHB module 200A transitions from the da phase to the rq phase, each of the directed edges (328, 330, 332) points to the rq phase includes a token (329, 331, 333), as shown in FIG. 3B. As described above, a directed edge is an edge with a direction that originates from a first phase and points to a second phase. In some embodiments, as shown in FIG. 3B, the directed edge 330 may represent an edge originates from a phase in the next stage (e.g., one of the rq, ak, dr, and da phases in a FP-TMG of the next stage) to the rq phase in the current stage. Similarly, the directed edge 332 may represent an edge originates from a phase in the previous stage (e.g., one of the rq, ak, dr, and da phases in a FP-TMG of the previous stage) to the rq phase in the current stage. In some embodiments, such a directed edge pointing to a specific phase is referred to as a "fan-in (FI) edge" of that phase, hereinafter. For example, the rq phase of the current stage may have FI edges: 328, 330, and 332. In some embodiments, a directed edge may have at most one token and when a directed edge has a token, it is generally meant that the directed edge is ready for a transition of phases (i.e., a transition from a first phase from which the directed edge originates to a second phase to which the directed edge points) to occur. And such a transition may occur under the condition that each of the FI edges of the second phase (i.e., the phase being pointed to) has a token. The location of such a token (e.g., which directed edge include a token) in a FP-TMG may be based on the operation of the module that corresponds to the FP-TMG, in accordance with various embodiments. A representative meaning of each of the tokens 323, 325, 327, 329, 331, 333, and 335 in FIG. 3B will be described in further detail below.

For example, the token 329 on the directed edge 328 (i.e., a token from the da to rq phases of the current stage) may represent that the directed edge 328 is ready, the token 331 on the directed edge 330 (i.e., a token from a phase of the next stage to the rq phase of the current stage) may represent that the directed edge 330 is ready; the token 333 on the directed edge 332 (i.e., a token from a phase of the previous stage or a user to the rq phase of the current stage) may represent that the directed edge 332 is ready to transition to its next designated phase. And the current stage may transition to the rq phase upon the above-mentioned conditions being met (i.e., each of the FI edges of the rq phase has a token). In the illustrated embodiment of FIG. 3B, all the FI edges (328, 330, 332) of the rq phase of the current stage each has a token (329, 331, 333), so the current stage transitions from the da phase to the rq phase. In some specific embodiments in which the previous, current, and next stages of a pipeline circuit are all PCHB modules, the token 329 on the directed edge 328 may correspond to a state of the current stage when ack_out of the current stage is at a logical 1 (i.e., the current stage has finished the pre-charging); the token 331 on the directed edge 330 may correspond to a state of the current stage when ack_in of the current stage is at a logical 1 and simultaneously ack_out of the next stage is also at a logical 1 (i.e., the next stage has finished the pre-charging); the token 333 on the directed edge 332 may correspond to a state of the current stage when each of the inputs X and Y of the current stage is either at DATA 1 or DATA 0 states (i.e., upon the inputs X and Y receiving input data).

More specifically in FIG. 3B, while a stage transitions to a phase, the stage starts to perform a "behavior" corresponding to that phase by consuming token(s) on that phase's FI edge(s), and accordingly "fires" token(s) on directed edge(s) that originate from that phase. By "fire," it is meant that a token is provided/emitted from a phase. Such a directed edge originating from a phase is referred to as a "fan-out (FO) edge" of that phase, hereinafter. In the example in which the current stage transitions from the da phase to the rq phase, the current stage fires a token 323 on its FO edge (i.e., the directed edge 322). Note that a FO edge of one phase is a FI edge of another phase. In particular, the FO edge of the rq phase (322) is a FI edge of the ak phase and such a FI edge of the ak phase has token 323 thereby causing the current stage to transition from the rq phase to the ak phase.

Referring back to FIG. 2A, as one example, after the logic evaluation block 206 finishes the evaluation of inputs X and Y, output Z may change in accordance with the evaluation on the inputs X and Y. Using the same example, after the evaluation, outputs of NOR1 and NOR2 (i.e., input completion detector 202) remain at logical 0's; output of NOR3 (i.e., output completion detector 204) transitions from a logical 1 to a logical 0. As such, all inputs to CE become logical 0's, which causes CE to output a logical 0. As described above, ack_out (coupled to the output of CE) transitions from a logical 1 to a logical 0. In some embodiments, such an "after-evaluation" phase of the PCHB module 200A may correspond to the "ak" phase of the FP-TMG 320 of FIG. 3B (i.e., transitioning from rq phase to ak phase through the directed edge 322). Accordingly, the firing time of the ak phase of the PCHB module 200A may correspond with when the evaluation finishes. In some specific embodiments in which the previous, current, and next stages of a pipeline circuit are all PCHB modules (FIG. 3B), the token 323 on the directed edge 322 may correspond to a state of the current stage when output (e.g., output Z) of the current stage transitions from the NULL state to either DATA 1 or DATA 0 states (i.e., the current stage has finished the evaluation).

Referring again to FIG. 3B, as described above, while the current stage is at the ak phase, the current stage consumes the token 323 on the FI edge 322 of the ak phase and accordingly fires token(s) on the ak phase's FO edge(s). In the specific embodiment of FIG. 3B, the current stage fires token 325 through the ak phase's only FO edge 324 (i.e., the directed edge 324) that points to the dr phase of the current stage. Since the directed edge 324 is not the only FI edge of the dr phase (the dr phase still has another FI edge 334), the current stage may wait for a token (335) to be generated on the directed edge 334 to transition itself to the dr phase. The generation of the token 335 on the directed edge 334 will be discussed in further detail below.

Referring back to FIG. 2A (and in conjunction with FIG. 3B), as described above, ack_out of the current stage (i.e., the PCHB module 200A shown in FIG. 2A) may serve as ack_in of the previous stage. That is, when the evaluation is finished in the current stage (i.e., the current stage is at the ak phase), ack_out transitions from a logical 1 to a logical 0. In some embodiments, the token 325 on the directed edge 324 (FO edge of the ak phase) may correspond to a state when the evaluation is finished. More specifically, the token 325 corresponds to a state of the current stage when ack_out of the current stage transitions from a logical 1 to a logical 0. Similarly, when the next stage finishes its evaluation and transition its ack_out (next stage's ack_out) from a logical 1 to 0, ack_in of the current stage will transition from logical 1 to 0 accordingly. As such, P3 and P4 of the pre-charging circuit 209 are turned ON and N2 is turned OFF, which starts to pre-charge the logic evaluation block 206 through VDD and isolates the logic evaluation block 206 from VSS. In some embodiments, the transition of ack_in of the current stage from a logical 1 to 0 may correspond to the generation of the token 335 on the directed edge 334. Since one of the FI edges of the dr phase (i.e., the directed edge 324) already has token 325 on it, upon the token 335 being generated on the directed edge 334 (the other FI edge of the dr phase), the current stage transitions to the dr phase. Accordingly, at the dr phase, the current stages consumes all the tokens on the FI edges (324, 334) and fires a token 327 on the dr phase's FO edge 326, which will be described below. In some embodiments, such a "start-to-pre-charge" phase of the PCHB module 200A may correspond to the "dr" phase of the FP-TMG 320 (i.e., transitioning from ak phase to dr phase through the directed edge 324). Accordingly, the firing time of the dr phase of the PCHB module 200A may correspond with when the pre-charging starts.

Referring still to FIG. 2A (and in conjunction with FIG. 3B), subsequently, after the current stage finishes the pre-charging, output Z of the current stage transitions from a logical 1 or 0 (DATA 1 or DATA 0) to the NULL state. Such a transition of the output of the current stage from either DATA 1 or DATA 0 to the NULL state may correspond to the token 327 on the directed edge 326. Since the directed edge is the only FI edge of the da phase (and the FI edge has token 327), as illustrated in FIG. 3B, accordingly, the current stage transitions from the dr phase to the da phase and fires the token 328 on the directed edge 328 (a FO edge of the da phase). As described above, the da phase corresponds to the pre-charged phase of the PCHB module 200A. Accordingly, the firing time of the da phase of the PCHB module 200A may correspond with when the pre-charging finishes.

Following the above description, some embodiments of modeling behavioral phases of a pipeline circuit by using the FP-TMG are provided with respect to FIGS. 4-9. As described with respect to FIG. 1, to analyze performance of a circuit design (e.g., the logic netlist 110) and further optimize the circuit design, a logic synthesis system 100, as described above, and corresponding process may be used. In accordance with various embodiments, such a logic synthesis 100 may utilize at least the cell library 140 to generate the network design 135 and, based on the network design 135, use the performance analysis unit 150 to analyze the performance of the circuit design (e.g., calculating a cycle time of the circuit design). Further, the logic synthesis system and process 100 may use the deadlock detection unit 170 to optimize the circuit design. FIGS. 4-9 each illustrates a FP-TMG (400, 500, 600, 700, 800, 900) that is used to model an exemplary three-stage pipeline network design. As illustrated in FIGS. 4-9, each FP-TMG graph includes three sub FP-TMG graph (similar to 320 in FIG. 3B), wherein a first sub four-phase TMG denoted by numeral 1 is referred to as a previous stage of the pipeline network design (hereinafter "previous stage"); a second sub FP-TMG denoted by numeral 2 is referred to as a current stage of the pipeline network design (hereinafter "current stage"); a third sub FP-TMG denoted by numeral 3 is referred to as a next stage of the pipeline network design (hereinafter "next stage"). The previous stage is coupled to the current stage, and the current stage is coupled to the next stage. As such, the previous stage may communicate with the current stage, and the current stage may communicate with the next stage. In some embodiments, the FP-TMG may be provided at the performance analysis 150 unit, as described above. Although each of the examples shown in FIGS. 4-9 includes only three stages in a pipeline network, any desired number of stages may be used in a pipeline network design while remaining within the scope of the present disclosure.

Referring now to FIG. 4, the FP-TMG 400 illustrates an exemplary behavioral model of a pipeline network design that includes three PCHB modules disposed at the previous stage, current stage, and next stage, respectively. In some embodiments, each PCHB module in the pipeline network design of FIG. 4 is substantially similar to the PCHB module 200A of FIG. 2A. As such, the FP-TMG 400 is described in accordance with the operation of the PCHB module 200A, as discussed above. More specifically, the previous stage includes four phases: rq1, ak1, dr1, and da1. The rq1 phase transitions to the ak1 phase through directed edge 402; the ak1 phase transitions to the dr1 phase through directed edge 404; the dr1 phase transitions to the da1 phase through directed edge 406; the da1 phase transitions to the rq1 phase through directed edge 408. Similarly, the current stage includes four phases: rq2, ak2, dr2, and da2. The rq2 phase transitions to the ak2 phase through directed edge 410; the ak2 phase transitions to the dr2 phase through directed edge 412; the dr2 phase transitions to the da2 phase through directed edge 414; the da2 phase transitions to the rq2 phase through directed edge 416. Still similarly, the next stage includes four phases: rq3, ak3, dr13, and da3. The rq3 phase transitions to the ak3 phase through directed edge 418; the ak3 phase transitions to the dr3 phase through directed edge 420; the dr3 phase transitions to the da3 phase through directed edge 422; the da3 phase transitions to the rq3 phase through directed edge 424.

Referring still to FIG. 4, the FP-TMG 400 further includes plural "cross-stage" directed edges (hereinafter "cross edge") that each originates from a first phase of a first stage and points to a second phase of a second stage. As illustrated in FIG. 4, the FP-TMG 400 includes cross edge 426 that transitions from the ak1 phase to the rq2 phase; cross edge 428 that transitions from the ak2 phase to the dr1 phase; cross edge 430 that transitions from the da2 phase to the rq1 phase; cross edge 432 that transitions from the ak2 phase to the rq3 phase; cross edge 434 that transitions from the ak3 phase to the dr2 phase; cross edge 436 that transitions from the da3 phase to the rq2 phase. In some embodiments, the cross edge 426 may be substantially similar to the directed edge 332 of FIG. 3B; the cross edges 430 and 436 may be substantially similar to the directed edge 330 of FIG. 3B; the cross edges 428 and 434 may be substantially similar to the directed edge 334 of FIG. 3B. Moreover, as illustrated in FIG. 4, the FP-TMG 400 includes plural initial tokens 409, 431, 417, 437, and 425 that are each located on the directed edge 408, the cross edge 430, the directed edge 416, the cross edge 436, the directed edge 424, respectively. In some embodiments, the initial tokens 409, 417, and 425 are substantially similar to the token 329 of FIG. 3B; the initial tokens 431 and 437 are substantially similar to the token 331 of FIG. 3B.

Referring now to FIG. 5, the FP-TMG 500 illustrates an exemplary behavioral model of a pipeline network design that includes three Weak Conditional Half Buffer (WCHB) modules disposed at the previous stage, current stage, and next stage, respectively. In some embodiments, the operation of WCHB module is similar to the PCHB module except that a WCHB module needs to wait until all its inputs are in DATA states before the WCHB module starts evaluation. Thus, for clarity, the discussion of the operation of WCHB module is omitted. The FP-TMG 500 is provided based on the operation of the WCHB module. More specifically, the previous stage includes four phases: rq1, ak1, dr1, and da1. The rq1 phase transitions to the ak1 phase through directed edge 502; the ak1 phase transitions to the dr1 phase through directed edge 504; the dr1 phase transitions to the da1 phase through directed edge 506; the da1 phase transitions to the rq1 phase through directed edge 508. Similarly, the current stage includes four phases: rq2, ak2, dr2, and da2. The rq2 phase transitions to the ak2 phase through directed edge 510; the ak2 phase transitions to the dr2 phase through directed edge 512; the dr2 phase transitions to the da2 phase through directed edge 514; the da2 phase transitions to the rq2 phase through directed edge 516. Still similarly, the next stage includes four phases: rq3, ak3, dr13, and da3. The rq3 phase transitions to the ak3 phase through directed edge 518; the ak3 phase transitions to the dr3 phase through directed edge 520; the dr3 phase transitions to the da3 phase through directed edge 522; the da3 phase transitions to the rq3 phase through directed edge 524. The FP-TMG 500 also includes plural cross edges: 526 that transitions from the da1 phase to the dr2 phase; 528 that transitions from the da2 phase to the rq1 phase; 530 that transitions from the ak2 phase to the dr1 phase; 532 that transitions from the ak1 phase to the rq2 phase; 534 that transitions from the ak2 phase to the rq3 phase; 536 that transitions from the da3 phase to the rq2 phase; 538 that transitions from the ak3 phase to the rq2 phase; 540 that transitions from the da2 phase to the dr3 phase. Moreover, initial tokens 509, 517, 525, 529, and 537 are located at directed or cross edges 508, 516, 524, 528, and 536, respectively.

Referring now to FIG. 6, the FP-TMG 600 illustrates an exemplary behavioral model of a pipeline network design that includes three Pre Charged Full Buffer (PCFB) modules disposed at the previous stage, current stage, and next stage, respectively. In some embodiments, the operation of PCFB module is similar to the PCHB module except that a PCFB module may start evaluation upon the PCFB's next-stage module(s) finish evaluation. Thus, for clarity, the discussion of the operation of PCFB module is omitted. The FP-TMG 600 is provided based on the operation of the PCFB module. More specifically, the previous stage includes four phases: rq1, ak1, dr1, and da1. The rq1 phase transitions to the aid phase through directed edge 602; the aid phase transitions to the dr1 phase through directed edge 604; the dr1 phase transitions to the da1 phase through directed edge 606; the da1 phase transitions to the rq1 phase through directed edge 608. Similarly, the current stage includes four phases: rq2, ak2, dr2, and da2. The rq2 phase transitions to the ak2 phase through directed edge 610; the ak2 phase transitions to the dr2 phase through directed edge 612; the dr2 phase transitions to the da2 phase through directed edge 614; the da2 phase transitions to the rq2 phase through directed edge 616. Still similarly, the next stage includes four phases: rq3, ak3, dr13, and da3. The rq3 phase transitions to the ak3 phase through directed edge 618; the ak3 phase transitions to the dr3 phase through directed edge 620; the dr3 phase transitions to the da3 phase through directed edge 622; the da3 phase transitions to the rq3 phase through directed edge 624. The FP-TMG 600 also includes plural cross edges: 626 that transitions from the ak1 phase to the rq2 phase; 628 that transitions from the ak2 phase to the dr1 phase; 630 that transitions from the ak2 phase to the rq1 phase; 632 that transitions from the ak2 phase to the rq3 phase; 634 that transitions from the ak3 phase to the dr2 phase; and 636 that transitions from the ak3 phase to the rq2 phase. Moreover, initial tokens 609, 617, 625, 631, and 637 are located at directed or cross edges 608, 616, 624, 630, and 636, respectively.

Referring now to FIG. 7, the FP-TMG 700 illustrates an exemplary behavioral model of a pipeline network design that includes three NULL Convention Logic (NCL) modules disposed at the previous stage, current stage, and next stage, respectively. In some embodiments, the operation of NCL module is similar to the WCHB module except that an NCL module may start its evaluation when its next-stage module(s) start resetting their respective outputs to NULL states. Thus, for clarity, the discussion of the operation of NCL module is omitted. The FP-TMG 700 is provided based on the operation of the NCL module. More specifically, the previous stage includes four phases: rq1, aid, dr1, and da1. The rq1 phase transitions to the ak1 phase through directed edge 702; the ak1 phase transitions to the dr1 phase through directed edge 704; the dr1 phase transitions to the da1 phase through directed edge 706; the da1 phase transitions to the rq1 phase through directed edge 708. Similarly, the current stage includes four phases: rq2, ak2, dr2, and da2. The rq2 phase transitions to the ak2 phase through directed edge 710; the ak2 phase transitions to the dr2 phase through directed edge 712; the dr2 phase transitions to the da2 phase through directed edge 714; the da2 phase transitions to the rq2 phase through directed edge 716. Still similarly, the next stage includes four phases: rq3, ak3, dr13, and da3. The rq3 phase transitions to the ak3 phase through directed edge 718; the ak3 phase transitions to the dr3 phase through directed edge 720; the dr3 phase transitions to the da3 phase through directed edge 722; the da3 phase transitions to the rq3 phase through directed edge 724. The FP-TMG 700 also includes plural cross edges: 726 that transitions from the ak1 phase to the rq2 phase; 728 that transitions from the da1 phase to the dr2 phase; 730 that transitions from the rq2 phase to the dr1 phase; 732 that transitions from the dr1 phase to the rq1 phase; 734 that transitions from the ak2 phase to the rq3 phase; 736 that transitions from the da2 phase to the rq3 phase; 738 that transitions from the rq3 phase to the dr2 phase; and 740 that transitions from the dr3 phase to the rq2 phase. Moreover, initial tokens 709, 717, 725, 733, and 741 are located at directed or cross edges 708, 716, 724, 732, and 740, respectively.

Figure 8:
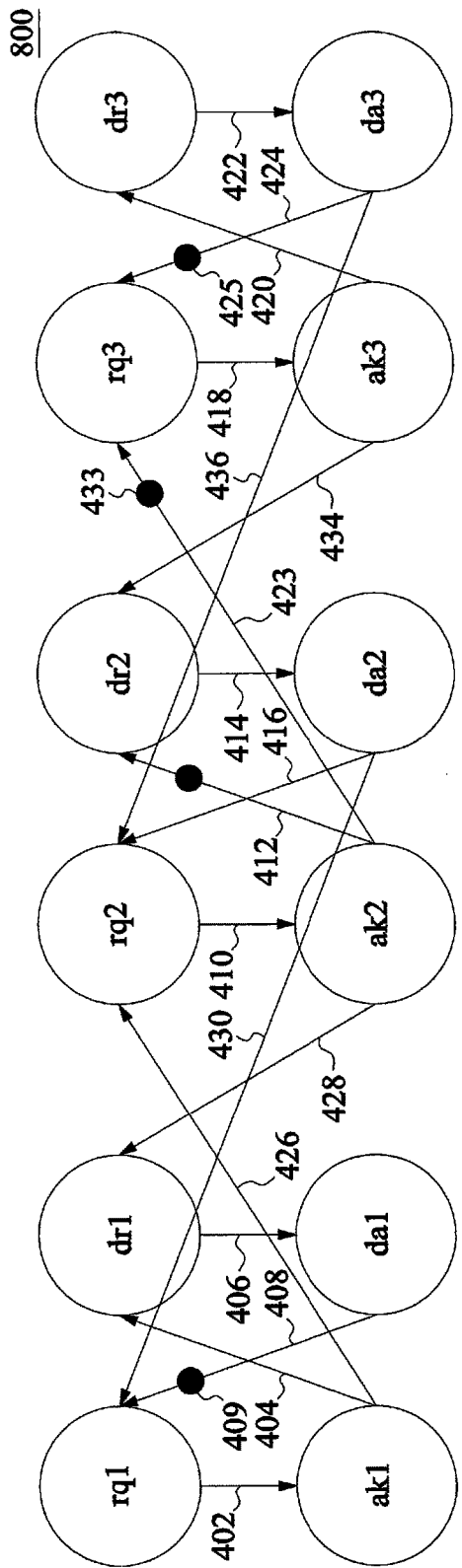
FIG. 8 illustrates a FP-TMG of a pipeline circuit including two Pre-Charged Half Buffer (PCHB) modules at a previous stage and a next stage of the pipeline circuit, respectively, and a reset-latch at a current stage of the pipeline, in accordance with some embodiments.

Referring now to FIG. 8, the FP-TMG 800 illustrates an exemplary behavioral modeling of a pipeline network design that includes two PCHB modules disposed at the previous stage, and next stage, respectively, and a reset-latch (similar to 200B, 200C in FIGS. 2B and 2C) disposed at the current stage. Accordingly, the FP-TMG 800 is substantially similar to the FP-TMG 400 except for the locations of initial tokens. At the beginning of operation of the system, the reset-latches (the current stage) may be viewed to have finished evaluation whereas other PCHB modules (the previous and next stages) can be viewed to have finished pre-charge. Thus, for brevity, the description of the phases, the directed edges, and the cross edges is omitted. In particular, the FP-TMG 800 includes initial tokens 409, 413, 433, and 425 that are located on directed edges or cross edges, 408, 412, 432, and 424, respectively.

Figure 9:
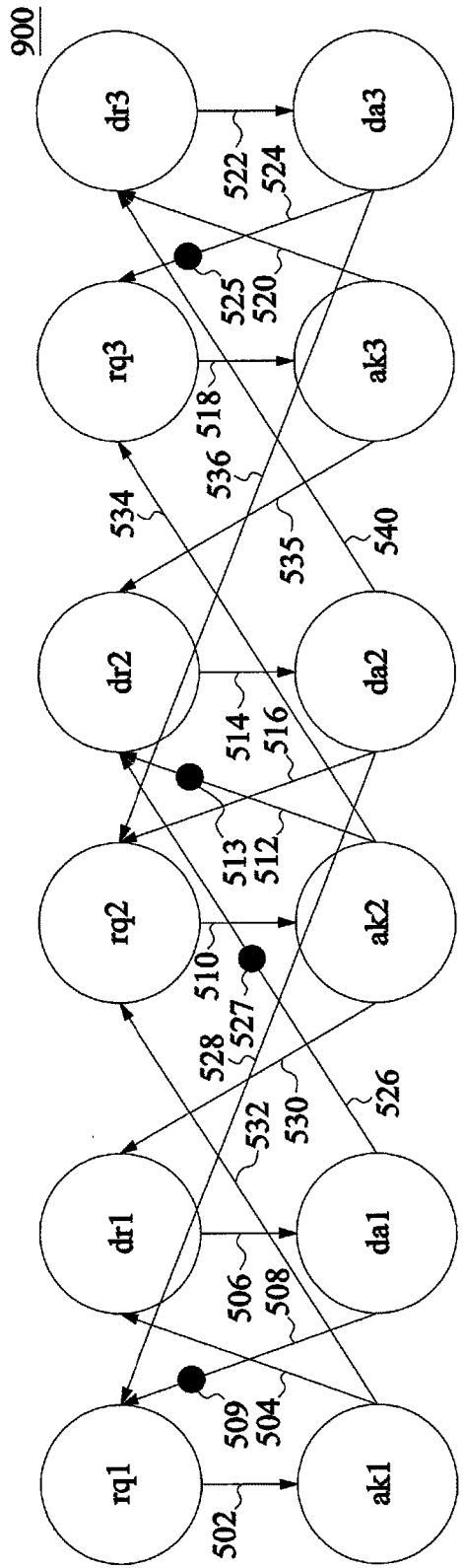
FIG. 9 illustrate a FP-TMG of a pipeline circuit including two WCHB modules at a previous stage and a next stage of the pipeline circuit, respectively, and a reset-latch at a current stage of the pipeline, in accordance with some embodiments.

Referring now to FIG. 9, the FP-TMG 900 illustrates an exemplary behavioral modeling of a pipeline network design that includes two WCHB modules disposed at the previous stage, and next stage, respectively, and a reset-latch (similar to 200B, 200C in FIGS. 2B and 2C) disposed at the current stage. Accordingly, the FP-TMG 900 is substantially similar to the FP-TMG 500 except for the locations of initial tokens. At the beginning of operation of the system, the (WCHB) reset-latch (current stage) can be viewed to have finished evaluation whereas other WCHB modules (previous and next stages) can be viewed to have finished pre-charge. Thus, for brevity, the description of the phases, the directed edges, and the cross edges is omitted. In particular, the FP-TMG 900 includes initial tokens 509, 513, 525, 527, and 535 that are located on directed edges or cross edges, 508, 512, 524, 526, and 534, respectively.

Each of FIGS. 4-9 merely provides an example of a FP-TMG used to model (behaviors of) a pipeline network design that is constituted of: a PCHB module, a WCHB module, a PCFB module, an NCL module, a reset-latch, or a combination thereof. However, a pipeline network design that includes any of a variety of asynchronous quasi-delay-insensitive (QDI) modules in the cell library 140 may by modeled by using the embodiments of the FP-TMG while remaining within the scope of the present disclosure.

Figure 10:
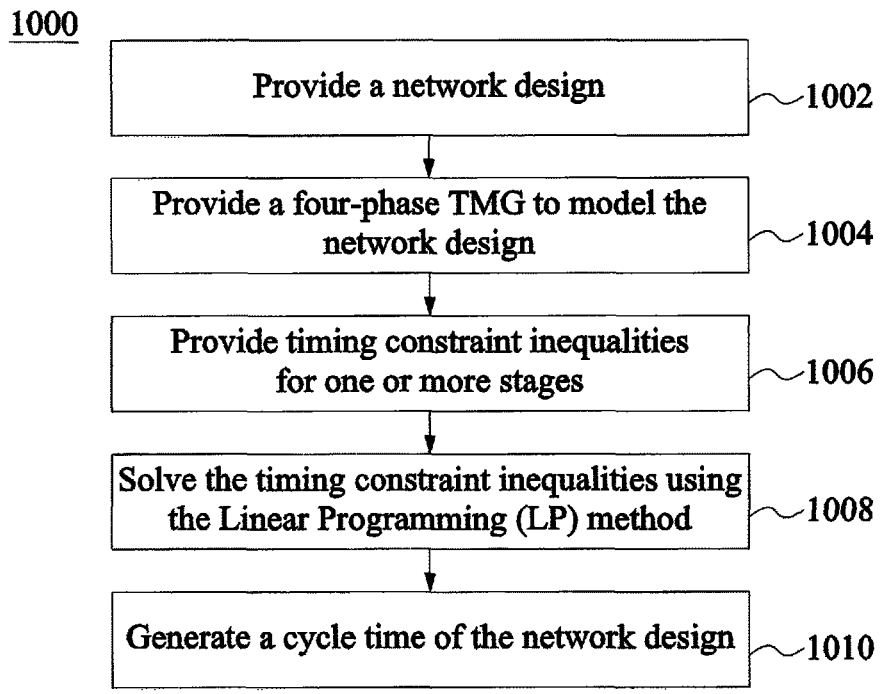
FIG. 10 illustrates a flow chart of a method to derive a cycle time of a pipeline network design using the Linear Programming (LP) method, in accordance with some embodiments.
Figure 11:
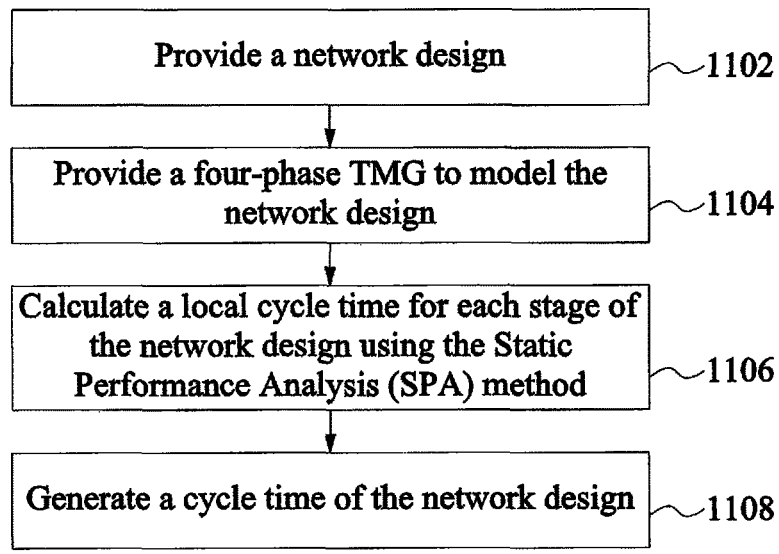
FIG. 11 illustrates a flow chart of a method to derive a cycle time of a pipeline network design using the Static Performance Analysis (SPA) method, in accordance with some embodiments.

With a FP-TMG being provided to model a pipeline network design, as illustrated in FIGS. 4-9, a cycle time of the pipeline network design may be derived more efficiently by using a Linear Programming (LP) method and a Static Performance Analysis (SPA) method as described with respect to FIGS. 10 and 11, respectively. Moreover, by using the disclosed embodiments of FIGS. 12 and 13, respectively, a presence of a deadlock in the pipeline network design may be detected and a redundant latch buffer may be detected. As such, the pipeline network design may be further optimized.

Referring now to FIG. 10, a flow chart of a method 1000 to derive a cycle time of a pipeline network design using the LP method is illustrated. Generally, the LP method is a process of taking various linear inequalities relating to some situations (e.g., under some constraints), and finding an "optimized" value obtainable under those constraints. As an example, a network design 135, as described above, may define a plurality of constraints under which a value (e.g., cycle time) may be optimized. The method 1000 starts at operation 1002 in which a network design (e.g., network design 135) is provided. As described above, in some embodiments, such a network design may be a network of interconnected nodes in which one or more mapped modules (in the cell library 140) are arranged at the corresponding nodes of the network. The method 1000 continues to operation 1004 in which a FP-TMG used to model the network design is provided. Although, as described above, the network design may be implemented as including any desired number of pipeline stages, and each stage of such a pipeline network design may include at least one of the modules in the cell library 140, the disclosed embodiments of the FP-TMG (described in FIGS. 3B-9) can be universally used to model the pipeline network design.

Referring still to FIG. 10, the method 1000 continues to operation 1006 in which, based on the FP-TMG, one or more timing constraint inequalities are generated for at least one stage of the pipeline network design. Using the FP-TMG 400 of FIG. 4 as an example, such a pipeline network design has three pipeline stages: the previous stage, the current stage, and the next stage. Accordingly, as described above, the FP-TMG 400 includes three sub FP-TMG's as well. In some embodiments, at the operation 1006, each FI edge of the four phases of the current stage (including directed edge(s) and cross edge(s)) may be provided with a timing constraint inequality. More specifically, the timing constraint inequality for a directed edge or a cross edge (hereinafter "edge") may be defined as:

$t(v) \geq t(u) + \delta(u,v) - \tau$, when the edge includes an initial token.

$t(v) \geq t(u) + \delta(u,v)$, when the edge does not include an initial token, wherein u represents a starting phase of the edge (i.e., the phase from which the edge originates), v represents an ending phase of the edge (i.e., the phase to which the edge points), t(u) represents a firing time at the staring phase of the edge u, t(v) represents a firing time at the ending phase of the edge v, δ(u, v) represents a delay time along the edge, τ represents a cycle time of the pipeline network design.

As such, still using the FP-TMG 400 as an example, the timing constraint inequalities of the FI edges of the four phases (rq2, ak2, dr2, da2) of the current stage may be provided as:

For edge 426, $t(rq2) \geq t(ak1) + \delta(ak1,rq2)$

For edge 410, $t(ak2) \geq t(rq2) + \delta(rq2,ak2)$

For edge 412, $t(dr2) \geq t(ak2) + \delta(ak2,dr2)$

For edge 414, $t(da2) \geq t(dr2) + \delta(dr2,da2)$

For edge 416, $t(rq2) \geq t(da2) + \delta(da2,rq2) - \tau$

For edge 434, $t(dr2) \geq t(ak3) + \delta(ak3,dr2)$

For edge 436, $t(rq2) \geq t(da3) + \delta(da3,rq2) - \tau$, wherein, in accordance with some embodiments, the delay time on all edges may be treated as a single constant.

Referring back to FIG. 10, the method 1000 continues to operation 1008 in which the timing constraint inequalities provided at operation 1006 are solved by using the LP method. As described above, the timing constraint inequalities, shown above, are used by the LP method to derive an optimized result, which is a minimum value of the cycle time τ. The method 1000 continues to operation 1010 in which the cycle time of the pipeline network design, τ, is derived.

In the above description of the method 1000, timing constraint inequalities for FI edges of the four phases of the current stage are provided (operation 1006) to be solved by the LP method (operation 1008). In some alternative embodiments, at operation 1006, timing constraint inequalities for all the edges in the FP-TMG (e.g., 400) are provided to be solved.

Referring now to FIG. 11, a flow chart of a method 1100 to derive a cycle time of a pipeline network design using the Static Performance Analysis (SPA) method is illustrated. In some embodiments, the SPA method is also referred to as the Static Timing Analysis (STA) method. Generally, the SPA method is a simulation method of computing one or more expected timings of a digital circuit without requiring a simulation of the full circuit. As such, based on the SPA method, a local cycle time for each stage of the pipeline network design is first derived, and then the cycle time of the whole pipeline network design is derived by comparing the derived local cycle times for the stages.

The method 1100 starts at operation 1102 in which a network design (e.g., network design 135) is provided. In some embodiments, such a network design may be a network of interconnected nodes in which one or more mapped modules (in the cell library 140) are arranged at the corresponding nodes of the network. The method 1100 continues to operation 1104 in which a FP-TMG used to model the network design is provided. Although, as described above, the network design may be implemented as including any desired number of pipeline stages, and each stage of such a pipeline network design may include at least one of the modules in the cell library 140, the disclosed embodiments of the FP-TMG (described in FIGS. 3B-9) can be universally used to model the pipeline network design.

Referring still to FIG. 11, the method 1100 continues to operation 1106 in which, based on the FP-TMG, a local cycle time for each of the stages of the pipeline network design is calculated. More specifically, for each stage, a local cycle time is calculated based on the firing time of a particular (single) phase of that stage. In this specific embodiment of using the SPA to derive the cycle time of the pipeline network design, the firing time of a particular phase is determined by comparing time period(s) of that particular phase's FI edge(s) that do not include an initial token, which is defined as follows.

$$t(v) = \max\{t(u) + \delta(u,v)\},$$

wherein u represents a starting phase of one of the particular phase's FI edges (i.e., the phase from which the edge originates), v represents an ending phase of all the FI edges (i.e., that particular phase in this specific embodiment), t(u) represents a firing time at the staring phase, t(v) represents the firing time at the ending phase, δ(u, v) represents a delay time along the one of the phase's FI edges, and "max" represents a comparison function to derive a largest value among a plurality of values. As such, the above-mentioned time period of that particular phase's (e.g., v) FI edge (e.g., u) may be represented by t(u)+δ(u, v), and t(v) may be derived as the largest value among plural time periods of that particular phase's all FI edges.

Using the FP-TMG 700 of FIG. 7 as an example, in some embodiments, to calculate the local cycle time of the current stage, the rq2 phase may be used (as that particular phase described above). More specifically, in FIG. 7, the rq2 phase includes three FI edges: 716, 726, and 740. Among these three FI edges, edges 716 and 740 have initial tokens 717 and 741, respectively. That is, only the time period along the edge 726 is to be compared in the "max" function. As such, in accordance with some embodiments of the present disclosure, the firing time of the rq2 phase may be represented as:

$$t(rq2) = t(ak1) + \delta(ak1, rq2)$$

Referring still to FIG. 7, in some other embodiments, each of the other phases dr2, ak2, and da2 at the current stage may be used to derive the local cycle time of the current stage. In an example in which the dr2 is used, the firing time of the dr2 phase may be represented as:

$$t(dr2) = \max\{t(ak2) + \delta(ak2, dr2), t(da1) + \delta(da1, dr2), t(rq3) + \delta(rq3, dr2)\},$$

wherein t(ak2)+δ(ak2, dr2) represents the time period along the edge 712; t(da1)+δ(da1, dr2) represents the time period along the edge 728; t(rq3)+δ(rq3, dr2) represents the time period along the edge 738. Then the firing time of the dr2 phase (i.e., t(dr2)) is the largest value among these three time periods.

Similarly, in an example in which the ak2 is used, the firing time of the ak2 phase may be represented as:

$$t(ak2) = t(rq2) + \delta(rq2, ak2),$$

wherein t(rq2)+δ(rq2, ak2) represents the time period along the edge 710. Still similarly, in an example in which the da2 is used, the firing time of the da2 phase may be represented as:

$$t(da2) = t(dr2) + \delta(dr2, da2),$$

wherein t(dr2)+δ(dr2, da2) represents the time period along the edge 714.

In some alternative embodiments, the current stage in FIG. 7 may include more than one previous stage and/or next stage. In other words, other than the previous stage and the next stage shown in FIG. 7, the current stage has one or more additional fan-in stages and/or one or more additional fan-out stages. Accordingly, for the current stage (as a non-limiting example), other than the edges shown in FIG. 7, one or more additional FI edges may be present between the current stage and the one or more additional fan-in stages. Similarly, one or more additional FT edges may be present between the current stage and the one or more additional fan-out stages. In an example, the firing time of the dr2 phase may be represented as:

$$t(dr2) = \max\Big\{t(ak2) + \delta(ak2, dr2),$$
$$\max_{u \in FI(current\,stage)} \{t(u.da) + \delta(da, dr2)\},$$
$$\max_{u \in FO(current\,stage)} \{t(u.rq) + \delta(rq, dr2)\}\Big\},$$

wherein $$\max_{u \in FI(current\,stage)} \{t(u.da) + \delta(da, dr2)\}$$

represents all the time periods along edges from da phases of all fan-in stages of the current stage (including the da1 phase as shown in FIG. 7) are to be compared by the max function, and $$\max_{u \in FO(current\,stage)} \{t(u.rq) + \delta(rq, dr2)\}$$

represents all the time periods along edges from rq phases of all fan-out stages of the current stage (including the rq3 phase as shown in FIG. 7) are to be compared by the max function.

Referring back to the operation 1106 of FIG. 11, upon a firing time of a particular phase of a stage being determined, the local cycle time of that stage may be determined by using the following equation, $$\tau_{local} = A - B$$

$A = \max\{t(x) + \delta(x,n)\}$, for the edge from x to n having an initial token $B = \max\{t(y) + \delta(y,n)\}$, for the edge from y to n having no initial token, wherein "n" represents the particular phase, t(x)+δ(x, n) represents a time period along the edge from the x phase to the n phase and such an edge has an initial token, t(y)+δ(y, n) represents a time period along the edge from the y phase to the n phase and such an edge does not have an initial token. Continuing using the same example of FIG. 7, the local cycle time of the current stage by using the firing time of the rq2 phase (the particular phase) can be represented as, $$\max\{t(da2) + \delta(da2, rq2), t(dr3) + \delta(dr3, rq2)\} - (t(ak1) + \delta(ak1, rq2))$$

wherein t(da2)+δ(da2,rq2) represents a time period along the edge 716 having initial token 717, t(dr3)+δ(dr3,rq2) represents a time period along the edge 740 having initial token 741, t(ak1)+δ(ak1,rq2) represents a time period along the edge 726 having no initial token.

Although the above discussion is directed to calculating the local cycle time of the current stage of FIG. 7, the calculations of the local cycle times for the previous stage and next stage, respectively, are substantially similar to the calculation of the local cycle time of the current stage. Thus, for brevity, the discussion of the calculations of the local cycle times for the previous stage and next stage is omitted. Referring back to FIG. 11, after the local cycle time for each of the stages are derived (operation 1106), the method continues to operation 1108 in which the cycle time of the pipeline network design is determined. In some embodiments, the largest value among the local cycle times of all the stages of the pipeline network design may be determined as the cycle time of the pipeline network design.

Figure 12:
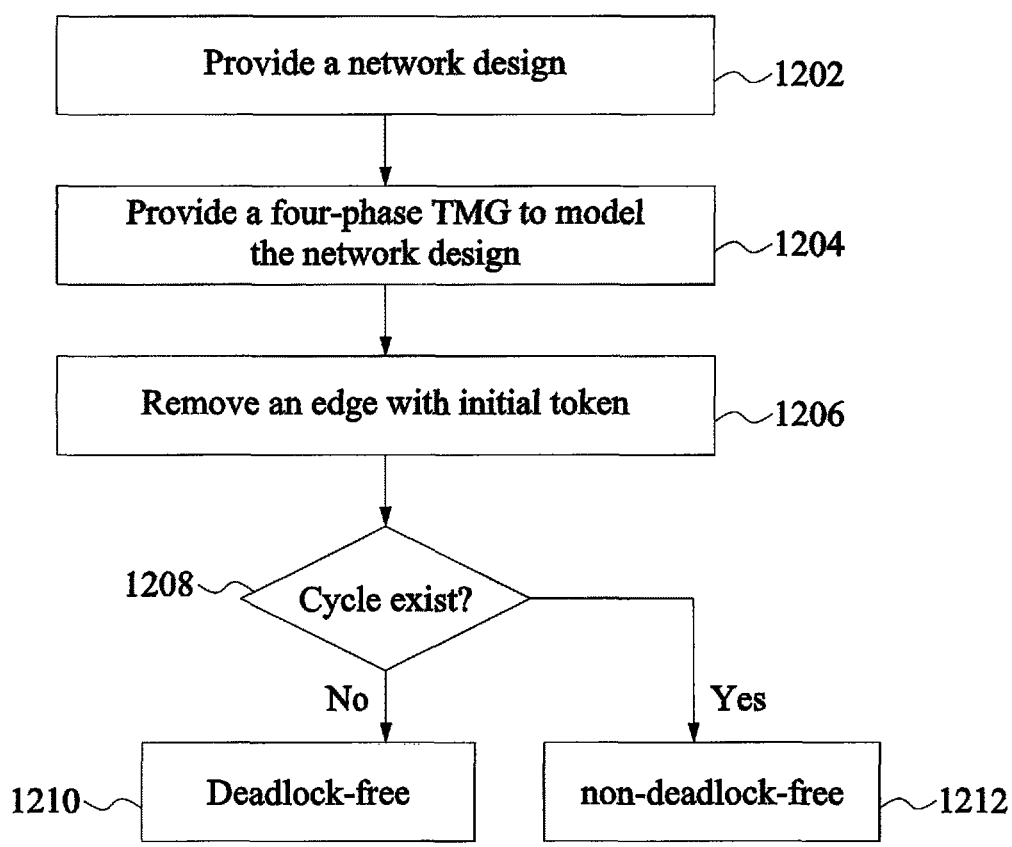
FIG. 12 illustrates a flow chart of a method detect whether a deadlock exists in a pipeline network design, in accordance with some embodiments.

Referring now to FIG. 12, a flow chart of a method 1200 to detect whether a deadlock exists in a pipeline network design is illustrated. The method 1200 starts at operation 1202 and 1204, which are substantially similar to the operations (1002, 1004) and (1102, 1104), respectively. Thus, the discussion of the method 1200 starts from operation 1206 in which an edge having an initial token is removed. More specifically, in some embodiments, at operation 1206, a process to detect whether a cycle exists in the FP-TMG (operation 1204) may be performed before removing an edge. In some embodiments, a cycle in a FP-TMG may be referred to as a loop that are constituted of plural phases and edges, and the loop has a starting phase and an ending phase at a same phase. As such, the terms "loop" and "cycle" may be used interchangeably hereinafter.

Using the FP-TMG 400 of FIG. 4 as an example, a loop is constituted of: the rq1 phase (as a starting phase), along the edge 402, the edge 426, the rq2 phase, the edge 410, the ak2 phase, the edge 432, the rq3 phase, the edge 418, the ak3 phase, the edge 434, the dr2 phase, the edge 414, the da2 phase, the edge 430, and back to the rq1 phase (as a ending phase). Referring still to FIG. 4, the edge 430 in the loop has the initial token 431. Accordingly, the edge 430 is removed from the FP-TMG 400 (operation 1206 of FIG. 12).

The method 1200 continues to operation 1208 in which whether the presence of the loop remains, in accordance with various embodiments. If the loop does not exist, the method 1200 routes to operation 1210 in which the pipeline network design is determined as a deadlock-free design (i.e., a circuit will not have a deadlock occurred while the circuit is built to operate based on the deadlock-free design). On the other hand, if the loop still remains, the method 1200 routes to operation 1212 in which the pipeline network design is determined as a non-deadlock-free design (i.e., a circuit may have a deadlock occurred while the circuit is built to operate based on the non-deadlock-free design). Using still the FP-TMG 400 as an example, after the edge 430 is removed, the above-described loop does not exist. Thus, the network design provided at operation 1202 may be a deadlock-free design.

Figure 13:
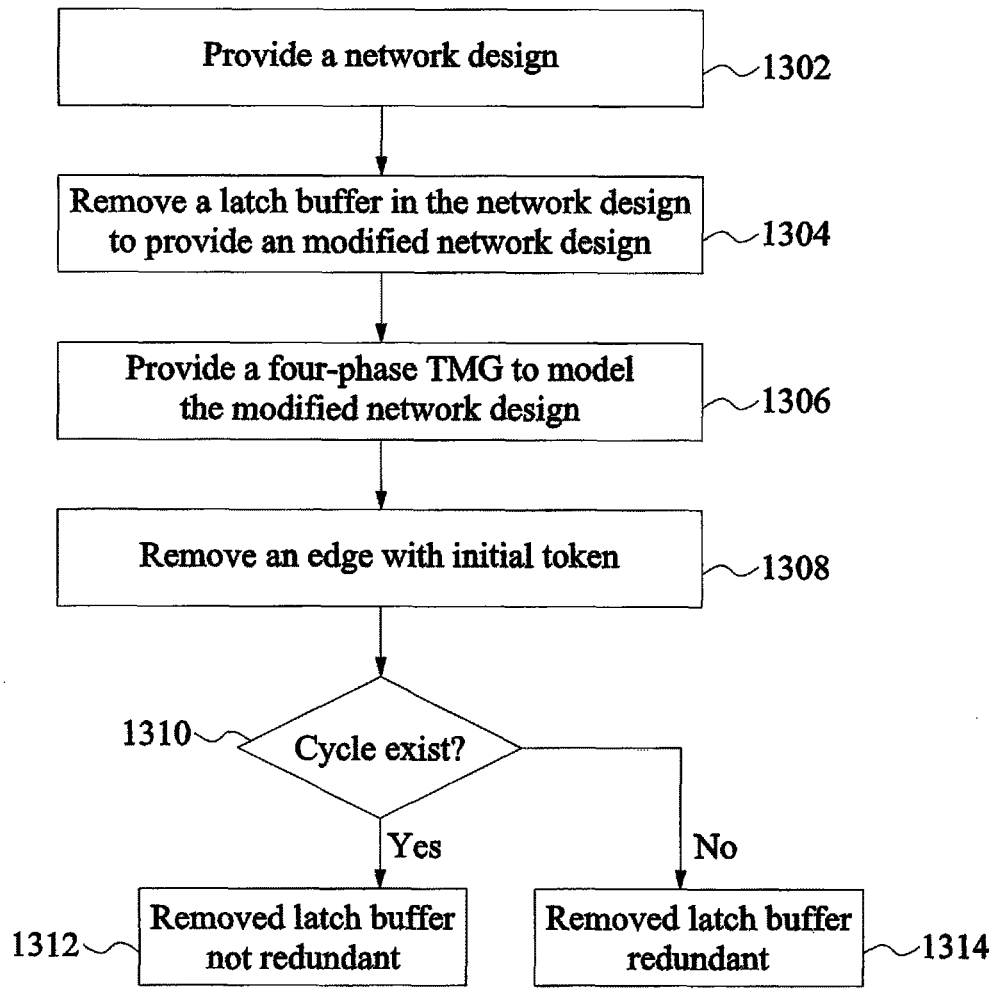
FIG. 13 illustrates a flow chart of a method to detect whether a redundant latch-buffer exists in a pipeline network design, in accordance with some embodiments.

FIG. 13 illustrates a flow chart of a method 1300 to detect whether a redundant latch-buffer exists in a pipeline network design, in accordance with various embodiments. The method 1300 starts at operation 1302 in which a network design (e.g., network design 135) is provided (similar to operations 1002, 1102, and 1202). The method 1300 continues to operation 1304 in which a latch-buffer is removed from the pipeline network design. In accordance with some embodiments, examples of such a latch-buffer may include the PCHB module 200A (FIG. 2A), the WCHB module, the PCFB module, the NCL module, and a combination thereof, but not include the reset-latch 200B and 200C (FIGS. 2B and 2C). After the latch-buffer is removed from the pipeline network design, a modified network design may be provided. The method 1300 then continues to operation 1306 in which a FP-TMG is provided based on the modified network design. The method 1300 then continues to operations 1308, and 1310 so as to determine whether the removed latch-buffer is redundant. In some embodiments, the operations 1308 (to detect a loop and remove an edge having an initial token) and 1310 (to determine whether the loop remains) are substantially similar to the operations 1206 and 1208 of FIG. 12, respectively. In some embodiments, if the determination at operation 1310 indicating that the loop still remains, the method 1300 continues to operation 1312 in which the removed latch-buffer is determined to be not redundant. If the determination at operation 1310 indicating that the loop does not exist, the method 1300 continues to operation 1314 in which the removed latch-buffer is determined to be redundant. Accordingly, the redundant latch-buffer may be removed from the original network design provided at operation 1302 so as to generate an optimized circuit design (e.g., 190 in FIG. 1).

Figure 14:
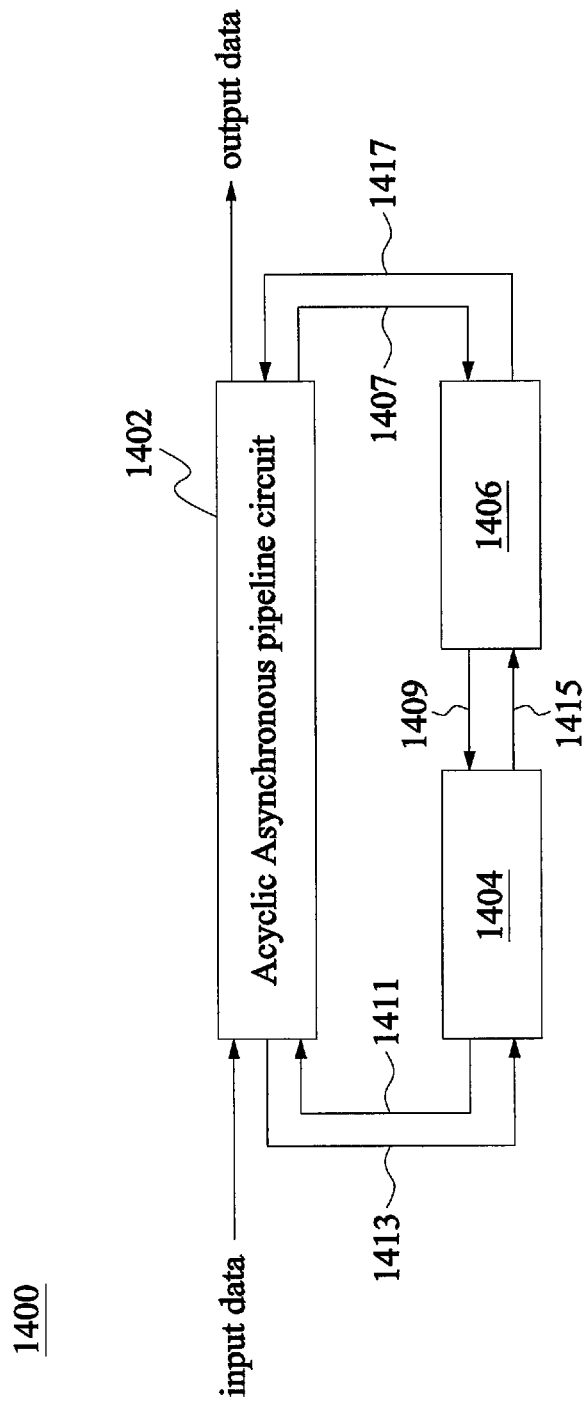
FIG. 14 illustrates a block diagram of a cyclic pipeline circuit design, in accordance with some embodiments.

FIG. 14 illustrates a block diagram of a cyclic pipeline circuit 1400, in accordance with various embodiments. In the illustrated embodiment of FIG. 14, the cyclic pipeline circuit 1400 includes an acyclic asynchronous pipeline circuit 1402, at least a reset-latch 1404 coupled to the acyclic asynchronous pipeline circuit 1402, and at least a latch-buffer 1406 coupled between the reset-latch 1404 and the acyclic asynchronous pipeline circuit 1402. In some embodiments, the reset-latch 1401 may be implemented as the reset-latch, as illustrated in FIGS. 2B and 2C; the latch-buffer 1406 may be implemented as one of the PCHB module (FIG. 2A), the WCHB module, the PCFB module, and the NCL module in the cell library 140; and the acyclic asynchronous pipeline circuit 1402 may include one or more PCHB modules (FIG. 2A), WCHB modules, PCFB modules, and NCL modules in the cell library 140 that are coupled to one another in series. In some embodiments, the acyclic asynchronous pipeline circuit 1402 is configured to receive input data, process the input data, and provide output data based on the process. In some embodiments, the acyclic asynchronous pipeline circuit 1402 may process the input data through the latch-buffer 1406 and the reset-latch 1404. More specifically, in the illustrated embodiment of FIG. 14, the acyclic asynchronous pipeline circuit 1402 provides data to the latch-buffer 1406, and, in response (to the reception of the data), the latch-buffer 1406 provides an acknowledge signal 1417 to the acyclic asynchronous pipeline circuit 1402. Accordingly, the latch-buffer 1406 processes the data received from the acyclic asynchronous pipeline circuit 1402 and provides the processed data 1409 to the reset-latch 1404. In response to the reception of the processed data 1409, the reset-latch 1404 provides an acknowledgement signal 1415 to the latch-buffer 1406. Further, in some embodiments, the reset-latch 1404 processes the data 1409 to provide data 1411 to the acyclic asynchronous pipeline circuit 1402. Similarly, in response to the reception of data 1411, the acyclic asynchronous pipeline circuit 1402 provides an acknowledgment signal 1413 to the reset-latch 1404. In accordance with various embodiments of the present disclosure, the above-mentioned methods of FIGS. 10-13 may be used in such a cyclic pipeline circuit 1400.

Figure 15:
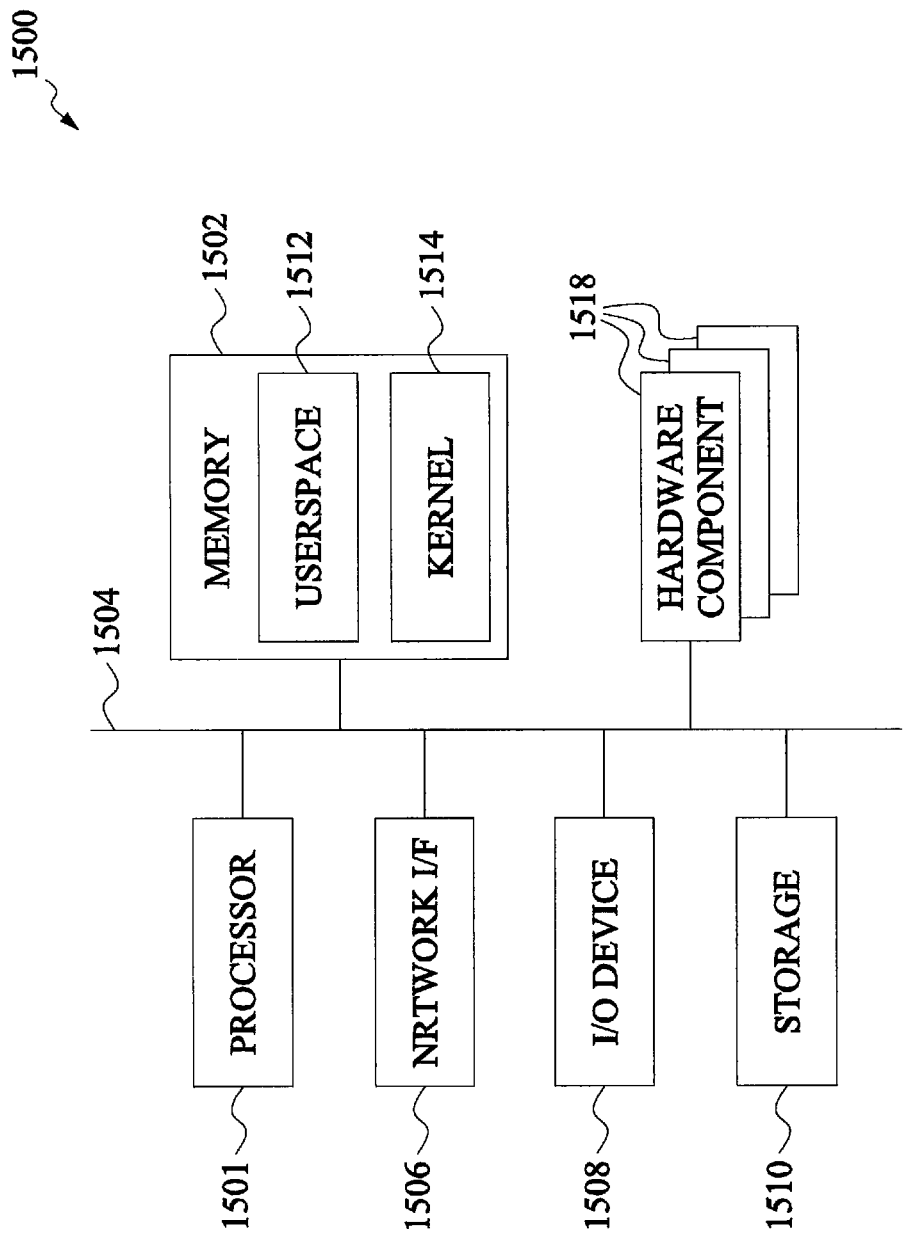
FIG. 15 illustrates a block diagram of a computer system, in accordance with some embodiments.

FIG. 15 is a block diagram of a computer system 1500 in accordance with some embodiments. One or more of the tools and/or engines and/or systems and/or operations described with respect to FIGS. 1-14 is realized in some embodiments by one or more computer systems 1500 of FIG. 15. The system 1500 comprises at least one processor 1501, a memory 1502, a network interface (I/F) 1506, an input/output (I/O) device 1508 and a storage 1510 communicatively coupled via a bus 1504 or other interconnection communication mechanism.

The memory 1502 comprises, in some embodiments, a random access memory (RAM) and/or other dynamic storage device and/or read only memory (ROM) and/or other static storage device, coupled to the bus 1504 for storing data and/or instructions to be executed by the processor 1501, e.g., kernel 1514, userspace 1516, portions of the kernel and/or the userspace, and components thereof. The memory 1502 is also used, in some embodiments, for storing temporary variables or other intermediate information during execution of instructions to be executed by the processor 1501.

In some embodiments, a storage device 1510, such as a magnetic disk or optical disk, is coupled to the bus 1504 for storing data and/or instructions, e.g., kernel 1514, userspace 1516, etc. The I/O device 1508 comprises an input device, an output device and/or a combined input/output device for enabling user interaction with the system 1500. An input device comprises, for example, a keyboard, keypad, mouse, trackball, trackpad, and/or cursor direction keys for communicating information and commands to the processor 1501. An output device comprises, for example, a display, a printer, a voice synthesizer, etc. for communicating information to a user.

In some embodiments, one or more operations and/or functionality of the tools and/or engines and/or systems described with respect to FIGS. 1-14 are realized by the processor 1501, which is programmed for performing such operations and/or functionality. In some embodiments, the processor 1501 is configured as specifically configured hardware (e.g., one or more application specific integrated circuits (ASICs)). In accordance with various embodiments, the processor 1501 may be implemented within a single integrated circuit (IC) or as multiple communicatively coupled IC's and/or discrete circuits. It is appreciated that the processor 1501 can be implemented in accordance with various known technologies. In one embodiment, the processor 1501 includes one or more circuits or units configurable to perform one or more functions or processes described herein by executing instructions stored in an associated memory, for example. In other embodiments, the processor 1501 may be implemented as firmware (e.g., discrete logic components) configured to perform one or more functions or processes described herein. For example, in accordance with various embodiments, the processor 1501 may include one or more controllers, microprocessors, microcontrollers, application specific integrated circuits (ASICs), digital signal processors, programmable logic devices, field programmable gate arrays, or any combination of these devices or structures, or other known devices and structures, to perform the functions described herein.

One or more of the memory 1502, the I/F 1506, the storage 1510, the I/O device 1508, the hardware components 1518, and the bus 1504 is/are operable to receive instructions, data, design constraints, design rules, netlists, layouts, models and/or other parameters for processing by the processor 1501.

In some embodiments, the operations and/or functionality are realized as functions of a program stored in a non-transitory computer readable recording medium. In at least one embodiment, the operations and/or functionality are realized as functions of a program, such as a set of executable instructions, stored in memory 1502. In at least one embodiment, a cell library, such as the cell library 140 (FIG. 1), is stored in a non-transitory computer readable recording medium for access by one or more operations as described herein. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

The above methods include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

In an embodiment, a method for providing a logic synthesis of a pipeline circuit is disclosed. The method includes: providing a circuit design of the pipeline circuit, wherein the circuit design includes a first logic module as a current stage, and based on an operation of the first logic module, generating a first time marked graph (TMG) that corresponds to a plurality of behavioral phases of the first logic module, wherein the first TMG includes a plurality of vertexes and edges, wherein each vertex corresponds to one of the plurality of behavioral phases that occur in sequence and each edge is coupled between two respective vertexes thereby corresponding to a transition from one behavioral phase to another subsequently occurring behavioral phase.

In another embodiment, a method for providing a logic synthesis of a pipeline circuit is disclosed. The method includes: providing a circuit design of the pipeline circuit, wherein the circuit design includes first, second, and third logic module as a previous stage, a current stage, and a next stage, respectively; based on operations of the first, second, and third logic modules, generating first, second, and third four-phase time marked graphs (FP-TMG's) that each corresponds to four behavioral phases of the previous, current, and next stages, respectively, wherein each of the first, second, and third FP-TMG's includes four vertexes and four edges, wherein the four vertexes of one of the stages respectively correspond to the four behavioral phases of the one of the stages, and wherein the four edges of one of the stages are each coupled between two respective vertexes of the one of the stages thereby corresponding to a transition from one behavioral phase to another subsequently occurring behavioral phase of the one of the stages Yet in another embodiment, a method for providing a logic synthesis of a pipeline circuit is disclosed. The method includes: providing a circuit design of the pipeline circuit, wherein the circuit design includes first, second, and third logic module as a previous stage, a current stage, and a next stage, respectively; based on operations of the first, second, and third logic modules, generating first, second, and third four-phase time marked graphs (FP-TMG's) that each corresponds to four behavioral phases of the previous, current, and next stages, respectively, wherein each of the first, second, and third FP-TMG's includes four vertexes and four edges, wherein the four vertexes of one of the stages respectively correspond to the four behavioral phases of the one of the stages, and wherein the four edges of one of the stages are each coupled between two respective vertexes of the one of the stages thereby corresponding to a transition from one behavioral phase to another subsequently occurring behavioral phase of the one of the stages; and based on the first, second, third FP-TMG's, generating a fourth FP-TMG that includes the first, second, third FP-TMG's and further includes a plurality of cross-stage edges each coupled between two vertexes that belong to first and second of the previous, current, and next stages, respectively, thereby corresponding to a transition from a behavioral phase of the first stage to a behavioral phase of the second stage, wherein each of the vertexes has a firing time that corresponds to when the corresponding behavioral phase occurs, and wherein the fourth FP-TMG further includes at least one initial token on one of the plurality of cross-stage edges that corresponds to that the transition from the behavioral phase of the first stage to the behavioral phase of the second stage is ready.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for providing a logic synthesis of a pipeline circuit, the method comprising:
    providing a circuit design of the pipeline circuit, wherein the circuit design includes a first logic module as a current stage; and
    based on an operation of the first logic module, generating a first time marked graph (TMG) that corresponds to a plurality of behavioral phases of the first logic module, wherein the first TMG includes a plurality of vertexes and a plurality of edges, wherein each vertex corresponds to one behavorial phase of the plurality of behavioral phases that occur in sequence and each edge is coupled between two respective vertexes thereby corresponding to a transition from one behavioral phase to another subsequently occurring behavioral phase.

2. The method of claim 1, wherein the first TMG includes four vertexes and four edges, and each vertex of the four vertexes has a firing time that corresponds to when a corresponding behavioral phase occurs.

3. The method of claim 2, wherein the first TMG further includes at least an initial token on one edge of the four edges, and wherein the initial token corresponds to that the first logic module is ready to transition from one behavioral phase to another behavioral phase that correspond to vertexes on both ends of the one edge of the four edges.

4. The method of claim 3, wherein the circuit design further includes a second logic module coupled to a current stage as a previous stage, and a third logic module coupled to the current stage as a next stage.

5. The method of claim 4, further comprising:
    based on an operation of the second logic module, generating a second TMG that corresponds to four behavioral phases of the second logic module, wherein the second TMG includes four vertexes and four edges, wherein each vertex of the four vertexes corresponds to one behavioral phase of the four behavioral phases that occur in sequence and each edge of the four edges is coupled between two respective vertexes thereby corresponding to a transition from one behavioral phase to another subsequently occurring behavioral phase.

6. The method of claim 5, further comprising:
    based on an operation of the third logic module, generating a third TMG that corresponds to four behavioral phases of the third logic module, wherein the third TMG includes four vertexes and four edges, wherein each vertex of the four vertexes corresponds to one behavioral phase of the four behavioral phases that occur in sequence and each edge of the four edges is coupled between two respective vertexes thereby corresponding to a transition from one behavioral phase to another subsequently occurring behavioral phase.

7. The method of claim 6, further comprising:
    based on the first TMG, the second TMG and the third TMG, generating a fourth TMG that includes the first TMG, the second TMG and the third TMG and further includes a plurality of cross-stage edges, wherein each cross-stage edge coupled between two vertexes that belong to a first stage and a second stage of a previous stage, a current stage, and a next stage, respectively, thereby corresponding to a transition from a behavioral phase of the first stage to a behavioral phase of the second stage.

8. The method of claim 7, wherein the fourth TMG further includes at least one cross stage edge initial token on one of the plurality of cross-stage edges that corresponds to that the transition from the behavioral phase of the first stage to the behavioral phase of the second stage is ready.

9. The method of claim 8, further comprising:
    using the fourth TMG to analyze a performance of the pipeline circuit; and
    based on an analysis result obtained in the analyzed performance, optimizing the circuit design of the pipeline circuit.

10. The method of claim 9, wherein the using the fourth TMG to analyze a performance of the pipeline circuit includes:
    generating a plurality of timing constraint inequalities based on the firing time of each vertex of the vertexes of the first TMG, the second TMG and the third TMG and which cross-edge has an initial token; and
    using a Linear Programming (LP) method to derive a cycle time of the pipeline circuit.

11. The method of claim 9, wherein the using the fourth TMG to analyze a performance of the pipeline circuit includes:
    deriving a local cycle time for the previous stage of the pipeline circuit by comparing time periods of fan-in edges of a vertex of the previous stage;
    deriving a local cycle time for the current stage of the pipeline circuit by comparing time periods of fan-in edges of a vertex of the current stage;
    deriving a local cycle time for the next stage of the pipeline circuit by comparing time periods of fan-in edges of a vertex of the next stage; and
    deriving a cycle time of the pipeline circuit by comparing the local cycle times of the previous stage, the current stage, and the next stage,
    wherein the time period of each fan-in edge of the fan-in edges is based on the firing time of a vertex from which said each fan-in edge originates.

12. The method of claim 9, wherein the using the fourth TMG to analyze a performance of the pipeline circuit includes:

removing an edge with an initial token from a cycle of the fourth TMG; and determining whether the circuit design of the pipeline circuit includes a deadlock by detecting a presence of the cycle.

13. A method for providing a logic synthesis of a pipeline circuit, the method comprising:

providing a circuit design of the pipeline circuit, wherein the circuit design includes a first logic module, a second logic module, and a third logic module as a previous stage, a current stage, and a next stage, respectively; and based on operations of the first logic module, the second logic module, and the third logic module, generating a first four-phase time marked graph (FP-TMG), a second FP-TMG, and a third FP-TMG that each FP-TMG corresponds to four behavioral phases of the previous stage, the current stage, and the next stage, respectively, wherein each FP-TMG of the first FP-TMG, the second FP-TMG, and the third FP-TMG includes four vertexes and four edges, wherein the four vertexes of one stage of the stages respectively correspond to the four behavioral phases of the one stage of the stages, and wherein each edge of the four edges of one stage of the stages is coupled between two respective vertexes of the one stage of the stages thereby corresponding to a transition from one behavioral phase to another subsequently occurring behavioral phase of the one stage of the stages.

14. The method of claim 13, further comprising:

based on the first FP-TMG, the second FP-TMG, and the third FP-TMG, generating a fourth FP-TMG that includes the first FP-TMG, the second FP-TMG, and the third FP-TMG and further includes a plurality of cross-stage edge, wherein each cross-stage edge coupled between two vertexes that belong to a first stage and a second stage of the previous stage, the current stage, and the next stage, respectively, thereby corresponding to a transition from a behavioral phase of the first stage to a behavioral phase of the second stage.

15. The method of claim 14, wherein each vertex of the vertexes has a firing time that corresponds to when a corresponding behavioral phase occurs.

16. The method of claim 15, wherein the fourth FP-TMG further includes at least one cross stage edge initial token on one of the plurality of cross-stage edges that corresponds to that the transition from the behavioral phase of the first stage to the behavioral phase of the second stage is ready.

17. The method of claim 16, further comprising:

generating a plurality of timing constraint inequalities based on the firing time of each vertex of the vertexes of the first FP-TMG, the second FP-TMG, and the third FP-TMG and which cross-edge has an initial token; and using a Linear Programming (LP) method to derive a cycle time of the pipeline circuit.

18. The method of claim 16, further comprising:

deriving a local cycle time for the previous stage of the pipeline circuit by comparing time periods of fan-in edges of a vertex of the previous stage;

deriving a local cycle time for the current stage of the pipeline circuit by comparing time periods of fan-in edges of the current stage's vertex;

deriving a local cycle time for the next stage of the pipeline circuit by comparing time periods of fan-in edges of a vertex of the next stage; and deriving a cycle, time of the pipeline circuit by comparing the local cycle times of the previous stage, the current stage, and the next stage, wherein the time period of each fan-in edge of the fan-in edges is based on the firing time of a vertex from which said each fan-in edge originates.

19. The method of claim 16, further comprising:

removing an edge with an initial token from a cycle of the fourth FP-TMG; and determining whether the circuit design of the pipeline circuit includes a deadlock by detecting a presence of the cycle.

20. A method for providing a logic synthesis of a pipeline circuit, the method comprising:

providing a circuit design of the pipeline circuit, wherein the circuit design includes a first logic module, a second logic module, and a third logic module as a previous stage, a current stage, and a next stage, respectively;

based on operations of the first logic module, the second logic module, and the third logic module, generating a first four-phase time marked graph (FP-TMG, a second FP-TMG, and a third FP-TMG (FP-TMG's) that each corresponds to four behavioral phases of the previous stage, the current stage, and the next stage, respectively, wherein each of the first FP-TMG, the second FP-TMG, and the third FP-TMG includes four vertexes and four edges, wherein the four vertexes of one of the stages respectively correspond to the four behavioral phases of the one of the stages, and wherein the four edges of one of the stages are each coupled between two respective vertexes of the one of the stages thereby corresponding to a transition from one behavioral phase to another subsequently occurring behavioral phase of the one of the stages; and based on the first FP-TMG, the second FP-TMG, and the third FP-TMG, generating a fourth FP-TMG that includes the first FP-TMG, the second FP-TMG, and the third FP-TMG and further includes a plurality of cross-stage edges, wherein each cross-stage edge coupled between two vertexes that belong to a first stage and a second stage of the previous stage, the current stage, and the next stage, respectively, thereby corresponding to a transition from a behavioral phase of the first stage to a behavioral phase of the second stage, wherein each vertex of the vertexes has a firing time that corresponds to when a corresponding behavioral phase occurs, and wherein the fourth FP-TMG further includes at least one cross-stage edge initial token on one of the plurality of cross-stage edges that corresponds to that the transition from the behavioral phase of the first stage to the behavioral phase of the second stage is ready.

* * * * *